US011229897B2

(12) United States Patent
Kimura et al.

(10) Patent No.: US 11,229,897 B2
(45) Date of Patent: Jan. 25, 2022

(54) CARBON DIOXIDE SORBENTS FOR AIR QUALITY CONTROL

(71) Applicant: BASF Corporation, Florham Park, NJ (US)

(72) Inventors: Riichiro Kimura, Jersey City, NJ (US); Mark Buelow, Flemington, NJ (US); John Kauffman, Hazlet, NJ (US); Pascaline Tran, Holmdel, NJ (US); Sai Ping Shum, Pleasantville, NY (US); Jeffrey Alan Levine, White Plains, NY (US); Wolfgang Ruettinger, East Windsor, NJ (US); David Weinberger, Marlboro, NJ (US)

(73) Assignee: BASF Corporation, Florham Park, NJ (US)

( * ) Notice: Subject to any disclaimer, the term of this patent is extended or adjusted under 35 U.S.C. 154(b) by 637 days.

(21) Appl. No.: 16/075,397

(22) PCT Filed: Feb. 10, 2017

(86) PCT No.: PCT/US2017/017342
§ 371 (c)(1),
(2) Date: Aug. 3, 2018

(87) PCT Pub. No.: WO2017/139555
PCT Pub. Date: Aug. 17, 2017

(65) Prior Publication Data
US 2019/0039047 A1   Feb. 7, 2019

Related U.S. Application Data

(60) Provisional application No. 62/354,473, filed on Jun. 24, 2016, provisional application No. 62/294,364, filed on Feb. 12, 2016.

(51) Int. Cl.
*B01J 20/32* (2006.01)
*B01J 20/28* (2006.01)
*B01D 53/02* (2006.01)
*B01J 20/10* (2006.01)

(52) U.S. Cl.
CPC ........ *B01J 20/3257* (2013.01); *B01D 53/025* (2013.01); *B01J 20/10* (2013.01); *B01J 20/28004* (2013.01); *B01J 20/28045* (2013.01); *B01J 20/28057* (2013.01); *B01J 20/28059* (2013.01); *B01J 20/28069* (2013.01); *B01J 20/3204* (2013.01); *B01J 20/3206* (2013.01); *B01J 20/3236* (2013.01); *B01J 20/3248* (2013.01); *B01J 20/3272* (2013.01); *B01J 20/3289* (2013.01); *B01D 2253/106* (2013.01); *B01D 2253/25* (2013.01); *B01D 2257/504* (2013.01); *B01D 2257/708* (2013.01); *B01D 2258/06* (2013.01); *B01D 2259/4508* (2013.01); *B01D 2259/4575* (2013.01); *Y02C 20/40* (2020.08)

(58) Field of Classification Search
CPC ........ B01J 20/32; B01J 20/3257; B01J 20/10; B01J 20/28004; B01J 20/28045; B01J 20/28057; B01J 20/28059; B01J 20/28069; B01J 20/3204; B01J 20/3206; B01J 20/3236; B01J 20/3248; B01J 20/3272; B01J 20/3289; B01D 53/025; B01D 2253/106; B01D 2257/708; B01D 2258/06; B01D 2259/4508; B01D 2259/4575; Y02C 20/40
USPC ...................................................... 502/401
See application file for complete search history.

(56) References Cited

U.S. PATENT DOCUMENTS

| | | |
|---|---|---|
| 4,096,085 A | 6/1978 | Holoman et al. |
| 4,443,354 A | 4/1984 | Eian |
| 5,206,204 A | 4/1993 | Tsutsumi et al. |
| 5,376,614 A | 12/1994 | Birbara et al. |
| 5,863,302 A | 1/1999 | Carey et al. |
| 5,948,726 A | 9/1999 | Moskovitz et al. |
| 5,962,379 A | 10/1999 | Carey et al. |
| 5,981,797 A | 11/1999 | Orth |
| 6,093,236 A | 7/2000 | Klabunde et al. |
| 6,200,542 B1 | 3/2001 | Poles et al. |
| 6,364,938 B1 | 4/2002 | Birbara et al. |
| 6,547,854 B1 | 4/2003 | Gray et al. |
| 6,670,304 B2 | 12/2003 | Chang |
| 6,908,497 B1 | 6/2005 | Sirwardane |
| 7,288,136 B1 | 10/2007 | Gray et al. |
| 7,300,500 B2 | 11/2007 | Okada et al. |

(Continued)

FOREIGN PATENT DOCUMENTS

| | | |
|---|---|---|
| CN | 101279237 | 10/2008 |
| CN | 101288847 | 10/2008 |

(Continued)

OTHER PUBLICATIONS

Wilfong, Walter Christopher et al., "Pelletization of Immobilized Amine Carbon Dioxide Sorbents with Fly Ash and Poly (vinyl chloride)", Energy Technology, vol. 4, No. 5, Jan. 27, 2016, 10 pages.
Extended European Search Report for Application No. 17750814.0 dated Sep. 6, 2019, 7 pages.

(Continued)

*Primary Examiner* — Edward M Johnson
(74) *Attorney, Agent, or Firm* — Lowenstein Sandler LLP

(57) ABSTRACT

Carbon dioxide and VOC sorbents that include a porous support impregnated with an amine compound are provided. The sorbents include a gas-adsorbing material coated onto the porous support. The gas-adsorbing material includes a polyamine which is produced using a process that is free of formaldehyde as a reaction product and/or a reactant.

11 Claims, 7 Drawing Sheets

(56) References Cited

U.S. PATENT DOCUMENTS

| | | |
|---|---|---|
| 7,314,847 B1 | 1/2008 | Siriwardane |
| 7,795,175 B2 | 9/2010 | Olah et al. |
| 7,820,591 B2 | 10/2010 | Ryu et al. |
| 8,247,346 B2 | 8/2012 | England |
| 8,362,300 B2 | 1/2013 | Pritschins et al. |
| 8,434,667 B2 | 5/2013 | Winkle et al. |
| 8,491,705 B2 | 7/2013 | Choi et al. |
| 8,491,710 B2 | 7/2013 | Meirav |
| 8,496,734 B2 | 7/2013 | Gadkaree et al. |
| 8,500,857 B2 | 8/2013 | Eisenberger |
| 8,557,027 B2 | 10/2013 | Peiffer et al. |
| 8,591,627 B2 | 11/2013 | Jain |
| 8,597,411 B2 | 12/2013 | Shahin et al. |
| 8,598,071 B1 | 12/2013 | Baugh et al. |
| 8,647,412 B2 | 2/2014 | Jiang et al. |
| 8,735,621 B2 | 5/2014 | Corma et al. |
| 8,834,822 B1 | 9/2014 | Gay et al. |
| 8,840,706 B1 | 9/2014 | Srinivasachar |
| 8,871,018 B2 | 10/2014 | Buri et al. |
| 9,102,595 B2 | 8/2015 | Haag et al. |
| 9,227,153 B2 | 1/2016 | Eisenberger |
| 9,266,051 B2 | 2/2016 | Wright et al. |
| 9,272,262 B2 | 3/2016 | Polshettiwar et al. |
| 9,333,485 B1 | 5/2016 | Siriwardane |
| 9,399,187 B2 | 7/2016 | Meirav et al. |
| 9,427,486 B2 | 8/2016 | Soulie et al. |
| 9,440,928 B2 | 9/2016 | Gupta et al. |
| 9,533,250 B2 | 1/2017 | Meirav et al. |
| 9,566,545 B2 | 2/2017 | Meirav et al. |
| 9,630,143 B2 | 4/2017 | Eisenberger et al. |
| 9,649,618 B2 | 5/2017 | Wang et al. |
| 9,682,361 B2 | 6/2017 | Brandt et al. |
| 9,844,766 B2 | 12/2017 | Eom et al. |
| 9,931,610 B2 | 4/2018 | Yogo et al. |
| 2003/0097933 A1 | 5/2003 | Choudary et al. |
| 2003/0232722 A1 | 12/2003 | Kato et al. |
| 2004/159605 A1 | 8/2004 | Hughes |
| 2004/0197253 A1 | 10/2004 | Twigg |
| 2005/0092176 A1 | 5/2005 | Ding et al. |
| 2006/0165574 A1 | 7/2006 | Sayari |
| 2008/0160276 A1 | 7/2008 | Inoue et al. |
| 2008/0293976 A1 | 11/2008 | Olah et al. |
| 2009/0030125 A1 | 1/2009 | Vedage et al. |
| 2009/0288557 A1 | 11/2009 | Carati et al. |
| 2010/0154636 A1 | 6/2010 | Liu et al. |
| 2010/0218681 A1 | 9/2010 | Yeager et al. |
| 2011/0158873 A1 | 6/2011 | Riman et al. |
| 2011/0257321 A1 | 10/2011 | Peretolchin et al. |
| 2011/0265648 A1 | 11/2011 | Meirav |
| 2012/0063978 A1 | 3/2012 | Baugh et al. |
| 2012/0070353 A1 | 3/2012 | Trukhan et al. |
| 2012/0076711 A1 | 3/2012 | Gebald et al. |
| 2012/0273720 A1 | 11/2012 | Lee et al. |
| 2013/0052109 A1 | 2/2013 | Davis et al. |
| 2013/0095996 A1 | 4/2013 | Buelow et al. |
| 2013/0121903 A1 | 5/2013 | Gupta et al. |
| 2013/0178987 A1 | 7/2013 | Meirav et al. |
| 2013/0207034 A1 | 8/2013 | Addiego |
| 2013/0213229 A1 | 8/2013 | Shahin et al. |
| 2013/0287662 A1 | 10/2013 | Chuang |
| 2013/0294991 A1 | 11/2013 | Jones et al. |
| 2013/0338001 A1 | 12/2013 | Giannelis et al. |
| 2014/0107003 A1 | 4/2014 | Gieselman et al. |
| 2014/0196631 A1 | 7/2014 | McDaniel |
| 2014/0202183 A1 | 7/2014 | Chadwick et al. |
| 2014/0241966 A1 | 8/2014 | Khunsupat et al. |
| 2014/0271394 A1 | 9/2014 | Jiang et al. |
| 2014/0298996 A1 | 10/2014 | Meirav et al. |
| 2014/0311341 A1 | 10/2014 | Jiang et al. |
| 2014/0312271 A1 | 10/2014 | Siriwardane et al. |
| 2014/0312273 A1 | 10/2014 | Wattebled et al. |
| 2014/0332720 A1 | 11/2014 | Eom et al. |
| 2015/0078964 A1 | 3/2015 | Meirav et al. |
| 2015/0251160 A1 | 9/2015 | Choi et al. |
| 2015/0320786 A1 | 11/2015 | Haag et al. |
| 2015/0352518 A1 | 12/2015 | Meirav et al. |
| 2016/0074831 A1 | 3/2016 | Begag et al. |
| 2016/0114337 A1 | 4/2016 | Snead et al. |
| 2016/0114338 A1 | 4/2016 | Snead |
| 2016/0175808 A1 | 6/2016 | Seo et al. |
| 2016/0199810 A1 | 7/2016 | Goeppert et al. |
| 2016/0228811 A1 | 8/2016 | Meirav et al. |
| 2017/0014802 A1 | 1/2017 | Hosomi et al. |
| 2017/0173523 A1 | 6/2017 | Fehrmann et al. |
| 2017/0197198 A1 | 7/2017 | Soukri et al. |
| 2017/0252693 A1 | 9/2017 | Kuroda et al. |
| 2017/0296961 A1 | 10/2017 | Beaumont et al. |
| 2017/0304764 A1 | 10/2017 | Goeppert et al. |
| 2018/0050322 A1 | 2/2018 | Kimura et al. |

FOREIGN PATENT DOCUMENTS

| | | |
|---|---|---|
| CN | 101623621 | 1/2010 |
| CN | 101973558 | 2/2011 |
| CN | 102908984 | 2/2013 |
| CN | 103120927 | 5/2013 |
| CN | 103418356 | 12/2013 |
| CN | 103920463 | 7/2014 |
| CN | 103990442 | 8/2014 |
| CN | 104475062 | 4/2015 |
| CN | 105498720 | 4/2016 |
| EP | 1293249 | 3/2003 |
| EP | 2558194 | 2/2013 |
| JP | H1085585 | 4/1998 |
| JP | 2000356022 | 12/2000 |
| JP | 2001025660 | 1/2001 |
| JP | 2001190950 | 7/2001 |
| JP | 2004105854 | 4/2004 |
| JP | 4273686 | 6/2009 |
| JP | 2012139622 | 7/2012 |
| JP | 6055134 | 12/2016 |
| KR | 20050012600 | 2/2005 |
| KR | 100898500 | 5/2009 |
| KR | 20120021899 | 3/2012 |
| KR | 20130047256 | 5/2013 |
| KR | 20150069268 | 6/2015 |
| KR | 101628033 | 6/2016 |
| KR | 101638109 | 7/2016 |
| WO | 03008120 | 1/2003 |
| WO | 2007074816 | 7/2007 |
| WO | 2012043942 | 4/2012 |
| WO | 2014208712 | 12/2014 |
| WO | 2016208718 | 12/2016 |

OTHER PUBLICATIONS

Wu, Xiao M., et al., "Identifying the CO2 Capture Performance of CaCl2-Supported Amine Adsorbent by the Improved Field Synergy Theory", Industrial & Engineering Chemistry Research, (2014), 53(24), 10225-10237, 1 page.

International Search Report and Written opinion dated Jun. 16, 2016 for International Application No. PCT/US2016/23727, 21 pages.

International Search Report and Written Opinion dated Apr. 20, 2017 for International Application No. PCT/US2017/17342, 15 pages.

CARBON DIOXIDE SORBENTS FOR AIR QUALITY CONTROL

CROSS-REFERENCE TO RELATED APPLICATIONS

This application is a national stage entry under 35 U.S.C. § 371 of International Application No. PCT/US2017/017342, filed on Feb. 10, 2017, which claims the benefit of priority of U.S. Provisional Patent Application No. 62/294,364, filed on Feb. 12, 2016, and U.S. Provisional Patent Application No. 62/354,473, filed on Jun. 24, 2016, the disclosures of which are hereby incorporated by reference herein in their entireties.

BACKGROUND $CO_2$ sorbent materials have been developed to improve the energy efficiency of HVAC systems. Specifically, HVAC systems have utilized $CO_2$ scrubbers that incorporate $CO_2$ sorbents to adsorb $CO_2$ from recirculated interior air and then release the $CO_2$ into outside air by a purging process. While such systems have improved upon conventional HVAC systems in terms of energy savings, the sorbent materials fail to meet long term targets for working capacity and thermal aging stability.

Moreover, traditional sorbent materials are generally adapted for one type of adsorption application. For example, $CO_2$ sorbents are insufficient for effectively removing volatile organic compounds (VOCs), such as formaldehyde, and VOC-specific sorbents are insufficient for effectively removing $CO_2$.

SUMMARY OF THE DISCLOSURE

The following presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method of preparing a sorbent comprises preparing a reaction solution comprising a first amine compound and a reactant, wherein the reactant comprises a carbonate ester compound or a ketone compound, and wherein the first amine compound reacts with the reactant to produce a second amine compound; and impregnating the second amine compound onto a porous support to produce the sorbent.

In one embodiment, the reaction solution is free of aldehyde (e.g., formaldehyde), and wherein a reaction product is free of aldehyde (e.g., formaldehyde).

In one embodiment, the first amine compound comprises a first number of amine moieties and the second amine compound comprises a second number of amine moieties that is greater than the first number of amine moieties. In one embodiment, the first number of amine moieties is one or greater. In one embodiment, the first number of amine moieties is greater than 2. In one embodiment, the first number of amine moieties is greater than 3. In one embodiment, the first number of amine moieties is greater than 4. In one embodiment, the first number of amine moieties is greater than 5.

In one embodiment, the first amine compound comprises pentaethylenehexamine, diethanolamine, tetraethylenepentamine, triethylenetetramine, tetraethylenetetramine, bis(2-hydroxypropyl)amine, N,N'-bis(2-hydroxyethyl)ethylenediamine, monoethanolamine, diisopropanolamine, alkylamines, methylamine, linear polyethyleneimine, branched polyethyleneimine, dimethylamine, diethylamine, methyldiethanolamine, methylethanolamine, polyethylene polyamine, diethylenetriamine, N,N'-bis-(3-aminopropyl) ethylenediamine, or polyethylene. In one embodiment, the first amine compound comprises pentaethylenehexamine.

In one embodiment, the carbonate ester compound is of a formula:

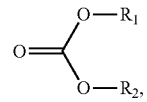

wherein $R_1$ and $R_2$ are independently selected from a group consisting of hydrogen, halogen, alkanoyl, alkyl, optionally substituted alkyl, cycloalkyl, optionally substituted cycloalkyl, alkenyl, optionally substituted alkenyl, cycloalkenyl, optionally substituted cycloalkenyl, alkynyl, optionally substituted alkynyl, hydroxy, aryl, optionally substituted aryl, aralkyl, (heterocyclo)alkyl, (heteroaryl)alkyl, (amino)alkyl, (alkylamino)alkyl, (dialkylamino)alkyl, (carboxamido)alkyl, (cyano)alkyl, alkoxyalkyl, and hydroxyalkyl. In one embodiment, the carbonate ester compound is of a formula:

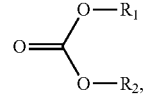

wherein $R_1$ comprises $C_nH_{2n+1}$, wherein $R_2$ comprises $C_mH_{2m+1}$, wherein n is an integer from 1 to 18, and wherein m is an integer from 1 to 18.

In one embodiment, the carbonate ester compound comprises an alkyl carbonate. The method of claim 11, wherein the alkyl carbonate comprises one or more of dimethyl carbonate or diethyl carbonate.

In one embodiment, the ketone comprises one or more of acetone, benzoin, ninhydrin, benzophenone, benzoin methyl ether, butanone, pentanone, hexanone, heptanone, methyl acetoacetate, or ethyl acetoacetate.

In one embodiment, the ketone comprises acetone.

In one embodiment, the second amine compound is present in an amount from 20% to 40% of a total weight of the sorbent.

In one embodiment, a deactivation factor of the sorbent is greater than 85%. In one embodiment, the deactivation factor of the sorbent is greater than 90%. In one embodiment, the deactivation factor of the sorbent is greater than 95%.

In one embodiment, a $CO_2$ adsorption capacity of the sorbent is greater than 11 g/L. In one embodiment, the $CO_2$ adsorption capacity of the sorbent is greater than 1.0 wt % computed as a weight of adsorbed $CO_2$ versus a weight of the sorbent. In one embodiment, the $CO_2$ adsorption capacity of the sorbent is greater than 1.5 wt % computed as a weight of adsorbed $CO_2$ versus a weight of the sorbent. In one embodiment, the $CO_2$ adsorption capacity of the sorbent is greater than 2.0 wt % computed as a weight of adsorbed $CO_2$ versus a weight of the sorbent. In one embodiment, the $CO_2$ adsorption capacity of the sorbent is greater than 2.2 wt % computed as a weight of adsorbed $CO_2$ versus a weight of the sorbent.

In one embodiment, the porous support comprises a clay. In one embodiment, the porous support comprises one or more of bentonite, attapulgite, kaolinite, montmorillonite, ball clay, fuller's earth, hectorite, palygorskite, saponite, sepiolite, halloysite, silica, calcium sulfate, zeolite, synthetic zeolite, alumina, titania, fumed silica, activated carbon, activated charcoal, or metal organic framework. In one embodiment, the porous support comprises attapulgite.

In one embodiment, the surface area of the porous support is greater than 50 $m^2/g$ prior to impregnation with the second amine compound.

In one embodiment, an average pore volume of the porous support is greater than 0.2 cc/g and less than 0.8 cc/g.

In one embodiment, an average pore volume of the porous support is greater than 0.1 cc/g and less than 3.0 cc/g.

In one embodiment, the porous support is in a form of granules having a diameter ranging from about 0.25 mm to about 5 mm.

In one embodiment, the support comprises a silicon-based coating formed thereon.

In one embodiment, the method further comprises forming a silicon-based coating on a porous support prior to the impregnation. In one embodiment, forming the silicon-based coating on the porous support comprises treating the porous support with one or more of tetraethylorthosilicate, colloidal silica, or sodium silicate.

In one embodiment, the method further comprises calcining the support prior to the impregnation. In one embodiment, calcining the porous support comprises calcining the porous support at a temperature from 400° C. to 600° C.

In another aspect of the present disclosure, a sorbent comprises a porous support; and a gas-adsorbing material coated onto the porous support, the gas-adsorbing material comprising one or more polyamines, wherein the sorbent is free of formaldehyde as a contaminant. For example, in some embodiments, the gas-adsorbing material is produced according to a process that is free of aldehyde (e.g., formaldehyde) as a reaction product.

In another aspect of the present disclosure, a $CO_2$ and/or VOC scrubbing system includes any embodiments of the aforementioned sorbent arranged to contact air received into the $CO_2$ and/or VOC scrubbing system. In one embodiment, the $CO_2$ and/or VOC scrubbing system includes one or more filtration cartridges having the sorbent disposed therein and arranged to contact a flow of air received into the $CO_2$ and/or VOC scrubbing system.

Any embodiments of the aforementioned sorbent may be disposed within the one or more filtration cartridges.

In another aspect of the present disclosure, a polytetrafluoroethylene air filter sheet includes any of the embodiments of the aforementioned sorbent.

In another aspect of the present disclosure, a method for treating air includes flowing a first volume of air into an air treatment chamber that includes any embodiments of the aforementioned sorbent, the first volume of air having a first $CO_2$ concentration, and contacting the sorbent with the first volume of air, wherein a second $CO_2$ concentration of the first volume of air is less than or equal to the first $CO_2$ concentration after the contacting. In some embodiments, the first volume of air comprises recirculated air from an interior of a building. In some embodiments, the method further includes flowing a second volume of air into the air treatment chamber, the second volume of air having a third $CO_2$ concentration, and contacting the sorbent with the second volume of air, wherein a fourth $CO_2$ concentration of the second volume of air is greater than or equal to the third $CO_2$ concentration of air after the contacting. In some embodiments, the second volume of air comprises air from outside of the building.

In another aspect of the present disclosure, an automobile ventilation system includes a component (e.g., a filter, filter unit, container, air duct, etc.) that includes any embodiments of the any embodiments of the aforementioned sorbent disposed within the component.

In another aspect of the present disclosure, an aircraft environmental control system includes a filter unit that includes any embodiments of the aforementioned sorbent may be disposed within the filter unit.

In another aspect of the present disclosure, an air control system for removing carbon dioxide from atmospheric air includes a filter unit that includes any embodiments of the aforementioned sorbent may be disposed within the filter unit. In another aspect of the present disclosure, a paint composition may comprise any embodiments of the aforementioned sorbent. In another aspect of the present disclosure, a food storage system may comprise any embodiments of the aforementioned sorbent.

As used herein, "deactivation factor" is used as a measure of a sorbent's stability against thermal aging using thermogravimetric analysis. When evaluating a sorbent's $CO_2$ adsorption capacity, deactivation factor corresponds to a ratio of $CO_2$ adsorption capacity after aging the sorbent (conditions: 100° C. for 6 hours in $N_2$ followed by 90° C. for 2 hours in air) to an initial $CO_2$ adsorption capacity. Higher deactivation factor indicates that the sorbent has higher stability against aging. A typical condition for adsorption/desorption of $CO_2$ cycle is as follows: adsorption for 30 min, 1000 ppm $CO_2$ (air balance: 20% $O_2$ and $N_2$ balance), 30° C.; desorption for 30 min, 400 ppm $CO_2$ ($N_2$ balance), 50° C. In an adsorption cycle that simulates food storage conditions, the $CO_2$ concentration may be at least 20%.

As used herein, the term "adsorbent material" refers to a material that can adhere gas molecules, ions, or other species within its structure (e.g., removal of $CO_2$ from air). Specific materials include but are not limited to clays, metal organic framework, activated alumina, silica gel, activated carbon, molecular sieve carbon, zeolites (e.g., molecular sieve zeolites), polymers, resins, and any of these components or others having a gas-adsorbing material supported thereon (e.g., such as the various embodiments of sorbents described herein). Certain adsorbent materials may preferentially or selectively adhere particular species.

As used herein, the term "adsorption capacity" refers to a working capacity for an amount of a chemical species that an adsorbent material can adsorb under specific operating conditions (e.g., temperature and pressure). The units of adsorption capacity, when given in units of g/L, correspond to grams of adsorbed gas per liter of sorbent.

Also as used herein, the term "activation" refers to the treatment of adsorption materials (e.g., $CO_2$ sorbent particles) in a manner to increase their storage capacity. Typically, the treatment results in removal of contaminants (e.g., water, non-aqueous solvent, sulfur compounds and higher hydrocarbons) from adsorption sites in order to increase the capacity of the materials for their intended purpose.

Also as used herein, the term "particles", as used herein, refers to a collection of discrete portions of a material each having a largest dimension ranging from 0.1 μm to 50 mm. The morphology of particles may be crystalline, semicrystalline, or amorphous. The size ranges disclosed herein can be mean/average or median size, unless otherwise stated. It is noted also that particles need not be spherical, but may be in a form of cubes, cylinders, discs, or any other suitable shape as would be appreciated by one of ordinary skill in the art. A "granule" may be a type of particle.

Also as used herein, the term "monolith" when referring to absorbent materials refers to a single block of the material. The single block can be in the form of, e.g., a brick, a disk or a rod and can contain channels for increased gas flow/distribution. In certain embodiments, multiple monoliths can be arranged together to form a desired shape.

Also as used herein, the term "alkyl" as used by itself or as part of another group refers to a linear or branched chain aliphatic hydrocarbon containing one to twelve carbon atoms (i.e., $C_{1-12}$ alkyl) or the number of carbon atoms designated (i.e., a $C_1$ alkyl such as methyl, a $C_2$ alkyl such as ethyl, a $C_3$ alkyl such as propyl or isopropyl, etc.). In one embodiment, the alkyl group is chosen from a linear chain $C_{1-10}$ alkyl group. In another embodiment, the alkyl group is chosen from a branched chain $C_{1-10}$ alkyl group. In another embodiment, the alkyl group is chosen from a linear chain $C_{1-6}$ alkyl group. In another embodiment, the alkyl group is chosen from a branched chain $C_{1-6}$ alkyl group. In another embodiment, the alkyl group is chosen from a linear chain $C_{1-4}$ alkyl group. In another embodiment, the alkyl group is chosen from a branched chain $C_{1-4}$ alkyl group. In another embodiment, the alkyl group is chosen from a linear or branched chain $C_{2-4}$ alkyl group. Non-limiting exemplary $C_{1-10}$ alkyl groups include methyl, ethyl, propyl, isopropyl, butyl, sec-butyl, tert-butyl, iso-butyl, 3-pentyl, hexyl, heptyl, octyl, nonyl, decyl, and the like. Non-limiting exemplary $C_{1-4}$ alkyl groups include methyl, ethyl, propyl, isopropyl, butyl, sec-butyl, tert-butyl, and iso-butyl.

Also as used herein, the term "optionally substituted alkyl" as used by itself or as part of another group means that the alkyl as defined above is either unsubstituted or substituted with one, two, or three substituents independently chosen from nitro, haloalkoxy, aryloxy, aralkyloxy, alkylthio, sulfonamido, alkylcarbonyl, arylcarbonyl, alkylsulfonyl, arylsulfonyl, ureido, guanidino, carboxy, carboxyalkyl, cycloalkyl, and the like. In one embodiment, the optionally substituted alkyl is substituted with two substituents. In another embodiment, the optionally substituted alkyl is substituted with one substituent. Non-limiting exemplary optionally substituted alkyl groups include —CH$_2$CH$_2$NO$_2$, —CH$_2$CH$_2$CO$_2$H, —CH$_2$CH$_2$SO$_2$CH$_3$, —CH$_2$CH$_2$COPh, —CH$_2$C$_6$H$_{11}$, and the like.

Also as used herein, the term "cycloalkyl" as used by itself or as part of another group refers to saturated and partially unsaturated (containing one or two double bonds) cyclic aliphatic hydrocarbons containing one to three rings having from three to twelve carbon atoms (i.e., $C_{3-12}$ cycloalkyl) or the number of carbons designated. In one embodiment, the cycloalkyl group has two rings. In one embodiment, the cycloalkyl group has one ring. In another embodiment, the cycloalkyl group is chosen from a $C_{3-8}$ cycloalkyl group. In another embodiment, the cycloalkyl group is chosen from a $C_{3-6}$ cycloalkyl group. Non-limiting exemplary cycloalkyl groups include cyclopropyl, cyclobutyl, cyclopentyl, cyclohexyl, cycloheptyl, cyclooctyl, norbornyl, decalin, adamantyl, cyclohexenyl, and the like.

Also as used herein, the term "optionally substituted cycloalkyl" as used by itself or as part of another group means that the cycloalkyl as defined above is either unsubstituted or substituted with one, two, or three substituents independently chosen from halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, heterocyclo, alkoxyalkyl, (amino)alkyl, hydroxyalkylamino, (alkylamino)alkyl, (dialkylamino)alkyl, (cyano)alkyl, (carboxamido)alkyl, mercaptoalkyl, (heterocyclo)alkyl, and (heteroaryl)alkyl. In one embodiment, the optionally substituted cycloalkyl is substituted with two substituents. In another embodiment, the optionally substituted cycloalkyl is substituted with one substituent. Non-limiting exemplary optionally substituted cycloalkyl groups include:

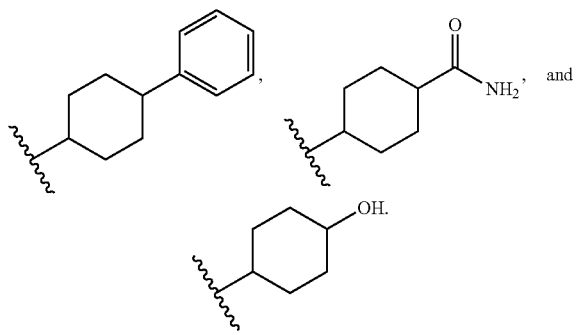

Also as used herein, the term "cycloalkenyl" as used by itself or part of another group refers to a partially unsaturated cycloalkyl group as defined above. In one embodiment, the cycloalkenyl has one carbon-to-carbon double bond. In another embodiment, the cycloalkenyl group is chosen from a $C_{4-8}$ cycloalkenyl group. Exemplary cycloalkenyl groups include cyclopentenyl, cyclohexenyl, and the like.

Also as used herein, the term "optionally substituted cycloalkenyl" as used by itself or as part of another group means that the cycloalkenyl as defined above is either unsubstituted or substituted with one, two, or three substituents independently chosen from halo, nitro, cyano, hydroxy, amino, alkylamino, dialkylamino, haloalkyl, monohydroxyalkyl, dihydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, heterocyclo, alkoxyalkyl, (amino)alkyl, hydroxyalkylamino, (alkylamino)alkyl, (dialkylamino)alkyl, (cyano)alkyl, (carboxamido)alkyl, mercaptoalkyl, (heterocyclo)alkyl, and (heteroaryl)alkyl. In one embodiment, the optionally substituted cycloalkenyl is substituted with two substituents. In another embodiment, the optionally substituted cycloalkenyl is substituted with one substituent. In another embodiment, the cycloalkenyl is unsubstituted.

Also as used herein, the term "alkenyl" as used by itself or as part of another group refers to an alkyl group as defined above containing one, two or three carbon-to-carbon double bonds. In one embodiment, the alkenyl group is chosen from a $C_{2-6}$ alkenyl group. In another embodiment, the alkenyl group is chosen from a $C_{2-4}$ alkenyl group. Non-limiting exemplary alkenyl groups include ethenyl, propenyl, isopropenyl, butenyl, sec-butenyl, pentenyl, and hexenyl.

Also as used herein, the term "optionally substituted alkenyl" as used herein by itself or as part of another group means the alkenyl as defined above is either unsubstituted or substituted with one, two or three substituents independently chosen from halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, or heterocyclo.

Also as used herein, the term "alkynyl" as used by itself or as part of another group refers to an alkyl group as defined above containing one to three carbon-to-carbon triple bonds. In one embodiment, the alkynyl has one carbon-to-carbon triple bond. In one embodiment, the alkynyl group is chosen from a $C_{2-6}$ alkynyl group. In another embodiment, the alkynyl group is chosen from a $C_{2-4}$ alkynyl group. Non-limiting exemplary alkynyl groups include ethynyl, propynyl, butynyl, 2-butynyl, pentynyl, and hexynyl groups.

Also as used herein, the term "optionally substituted alkynyl" as used herein by itself or as part of another group means the alkynyl as defined above is either unsubstituted or substituted with one, two or three substituents independently chosen from halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, or heterocyclo.

Also as used herein, the term "haloalkyl" as used by itself or as part of another group refers to an alkyl group substituted by one or more fluorine, chlorine, bromine and/or iodine atoms. In one embodiment, the alkyl group is substituted by one, two, or three fluorine and/or chlorine atoms. In another embodiment, the haloalkyl group is chosen from a $C_{1-4}$ haloalkyl group. Non-limiting exemplary haloalkyl groups include fluoromethyl, difluoromethyl, trifluoromethyl, pentafluoroethyl, 1,1-difluoroethyl, 2,2-difluoroethyl, 2,2,2-trifluoroethyl, 3,3,3-trifluoropropyl, 4,4,4-trifluorobutyl, and trichloromethyl groups.

Also as used herein, the term "hydroxyalkyl" as used by itself or as part of another group refers to an alkyl group substituted with one or more, e.g., one, two, or three, hydroxy groups. In one embodiment, the hydroxyalkyl group is a monohydroxyalkyl group, i.e., substituted with one hydroxy group. In another embodiment, the hydroxyalkyl group is a dihydroxyalkyl group, i.e., substituted with two hydroxy groups. In another embodiment, the hydroxyalkyl group is chosen from a $C_{1-4}$ hydroxyalkyl group. Non-limiting exemplary hydroxyalkyl groups include hydroxymethyl, hydroxyethyl, hydroxypropyl and hydroxybutyl groups, such as 1-hydroxyethyl, 2-hydroxyethyl, 1,2-dihydroxyethyl, 2-hydroxypropyl, 3-hydroxypropyl, 3-hydroxybutyl, 4-hydroxybutyl, 2-hydroxy-1-methylpropyl, and 1,3-dihydroxyprop-2-yl.

Also as used herein, the term "alkoxy" as used by itself or as part of another group refers to an optionally substituted alkyl, optionally substituted cycloalkyl, optionally substituted alkenyl, optionally substituted cycloalkenyl, optionally substituted alkynyl or optionally substituted alkynyl attached to a terminal oxygen atom. In one embodiment, the alkoxy group is chosen from a $C_{1-4}$ alkoxy group. In another embodiment, the alkoxy group is chosen from a $C_{1-4}$ alkyl attached to a terminal oxygen atom, e.g., methoxy, ethoxy, and tert-butoxy.

Also as used herein, the term "alkoxyalkyl" as used by itself or as part of another group refers to an alkyl group substituted with an alkoxy group. Non-limiting exemplary alkoxyalkyl groups include methoxymethyl, methoxyethyl, methoxypropyl, methoxybutyl, ethoxymethyl, ethoxyethyl, ethoxypropyl, ethoxybutyl, propoxymethyl, iso-propoxymethyl, propoxyethyl, propoxypropyl, butoxymethyl, tert-butoxymethyl, isobutoxymethyl, sec-butoxymethyl, and pentyloxymethyl.

Also as used herein, the term "haloalkoxy" as used by itself or as part of another group refers to a haloalkyl attached to a terminal oxygen atom. Non-limiting exemplary haloalkoxy groups include fluoromethoxy, difluoromethoxy, trifluoromethoxy, and 2,2,2-trifluoroethoxy.

Also as used herein, the term "aryl" as used by itself or as part of another group refers to a monocyclic or bicyclic aromatic ring system having from six to fourteen carbon atoms (i.e., $C_{6-14}$ aryl). Non-limiting exemplary aryl groups include phenyl (abbreviated as "Ph"), naphthyl, phenanthryl, anthracyl, indenyl, azulenyl, biphenyl, biphenylenyl, and fluorenyl groups. In one embodiment, the aryl group is chosen from phenyl or naphthyl.

Also as used herein, the term "optionally substituted aryl" as used herein by itself or as part of another group means that the aryl as defined above is either unsubstituted or substituted with one to five substituents independently chosen from halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, heterocyclo, alkoxyalkyl, (amino)alkyl, hydroxyalkylamino, (alkylamino)alkyl, (dialkylamino)alkyl, (cyano)alkyl, (carboxamido)alkyl, mercaptoalkyl, (heterocyclo)alkyl, or (heteroaryl)alkyl. In one embodiment, the optionally substituted aryl is an optionally substituted phenyl. In one embodiment, the optionally substituted phenyl has four substituents. In another embodiment, the optionally substituted phenyl has three substituents. In another embodiment, the optionally substituted phenyl has two substituents. In another embodiment, the optionally substituted phenyl has one substituent. Non-limiting exemplary substituted aryl groups include 2-methylphenyl, 2-methoxyphenyl, 2-fluorophenyl, 2-chlorophenyl, 2-bromophenyl, 3-methylphenyl, 3-methoxyphenyl, 3-fluorophenyl, 3-chlorophenyl, 4-methylphenyl, 4-ethylphenyl, 4-methoxyphenyl, 4-fluorophenyl, 4-chlorophenyl, 2,6-di-fluorophenyl, 2,6-di-chlorophenyl, 2-methyl, 3-methoxyphenyl, 2-ethyl, 3-methoxyphenyl, 3,4-dimethoxyphenyl, 3,5-di-fluorophenyl 3,5-di-methylphenyl, 3,5-dimethoxy, 4-methylphenyl, 2-fluoro-3-chlorophenyl, and 3-chloro-4-fluorophenyl. The term optionally substituted aryl is meant to include groups having fused optionally substituted cycloalkyl and fused optionally substituted heterocyclo rings. Examples include:

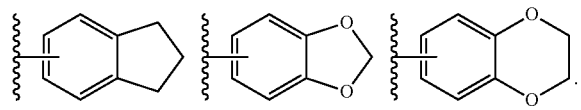

Also as used herein, the term "aryloxy" as used by itself or as part of another group refers to an optionally substituted aryl attached to a terminal oxygen atom. A non-limiting exemplary aryloxy group is PhO—.

Also as used herein, the term "aralkyloxy" as used by itself or as part of another group refers to an aralkyl group attached to a terminal oxygen atom. A non-limiting exemplary aralkyloxy group is $PhCH_2O$—.

Also as used herein, the term "heteroaryl" or "heteroaromatic" refers to monocyclic and bicyclic aromatic ring systems having 5 to 14 ring atoms (i.e., $C_{5-14}$ heteroaryl) and 1, 2, 3, or 4 heteroatoms independently chosen from oxygen, nitrogen and sulfur. In one embodiment, the heteroaryl has three heteroatoms. In another embodiment, the heteroaryl has two heteroatoms. In another embodiment, the heteroaryl has one heteroatom. In one embodiment, the heteroaryl is a $C_5$ heteroaryl. In another embodiment, the heteroaryl is a $C_6$ heteroaryl. Non-limiting exemplary heteroaryl groups include thienyl, benzo[b]thienyl, naphtho[2,3-b]thienyl, thianthrenyl, furyl, benzofuryl, pyranyl, isobenzofuranyl, benzooxazonyl, chromenyl, xanthenyl, 2H-pyrrolyl, pyrrolyl, imidazolyl, pyrazolyl, pyridyl, pyrazinyl, pyrimidinyl, pyridazinyl, isoindolyl, 3H-indolyl, indolyl, indazolyl, purinyl, isoquinolyl, quinolyl, phthalazinyl, naphthyridinyl, cinnolinyl, quinazolinyl, pteridinyl, 4aH-carbazolyl, carbazolyl, β-carbolinyl, phenanthridinyl, acridinyl, pyrimidinyl, phenanthrolinyl, phenazinyl, thiazolyl, isothiazolyl, phenothiazolyl, isoxazolyl, furazanyl, and phenoxazinyl. In one embodiment, the heteroaryl is chosen from thienyl (e.g., thien-2-yl and thien-3-yl), furyl (e.g., 2-furyl and 3-furyl), pyrrolyl (e.g., 1H-pyrrol-2-yl and 1H-pyrrol-3-yl), imidazolyl (e.g., 2H-imidazol-2-yl and 2H-imidazol-4-yl), pyrazolyl (e.g., 1H-pyrazol-3-yl, 1H-pyrazol-4-yl, and 1H-pyrazol-5-yl), pyridyl (e.g., pyridin-2-yl, pyridin-3-yl, and pyridin-4-yl), pyrimidinyl (e.g., pyrimidin-2-yl, pyrimidin-4-yl, pyrimidin-5-yl, and pyrimidin-5-yl), thiazolyl (e.g., thiazol-2-yl, thiazol-4-yl, and thiazol-5-yl), isothiazolyl (e.g., isothiazol-3-yl, isothiazol-4-yl, and isothiazol-5-yl), oxazolyl (e.g., oxazol-2-yl, oxazol-4-yl, and oxazol-5-yl) and isoxazolyl (e.g., isoxazol-3-yl, isoxazol-4-yl, and isoxazol-5-yl). The term "heteroaryl" is also meant to include possible N-oxides. Exemplary N-oxides include pyridyl N-oxide, and the like.

Also as used herein, the term "optionally substituted heteroaryl" as used by itself or as part of another group means that the heteroaryl as defined above is either unsubstituted or substituted with one to four substituents, e.g., one or two substituents, independently chosen from halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, heterocyclo, alkoxyalkyl, (amino)alkyl, hydroxyalkylamino, (alkylamino)alkyl, (dialkylamino)alkyl, (cyano)alkyl, (carboxamido)alkyl, mercaptoalkyl, (heterocyclo)alkyl, and (heteroaryl)alkyl. In one embodiment, the optionally substituted heteroaryl has one substituent. In one embodiment, the optionally substituted is an optionally substituted pyridyl, i.e., 2-, 3-, or 4-pyridyl. Any available carbon or nitrogen atom can be substituted. In another embodiment, the optionally substituted heteroaryl is an optionally substituted indole.

Also as used herein, the term "heterocycle" or "heterocyclo" as used by itself or as part of another group refers to saturated and partially unsaturated (e.g., containing one or two double bonds) cyclic groups containing one, two, or three rings having from three to fourteen ring members (i.e., a 3- to 14-membered heterocyclo) and at least one heteroatom. Each heteroatom is independently selected from the group consisting of oxygen, sulfur, including sulfoxide and sulfone, and/or nitrogen atoms, which can be quaternized. The term "heterocyclo" is meant to include cyclic ureido groups such as 2-imidazolidinone and cyclic amide groups such as β-lactam, γ-lactam, δ-lactam and ε-lactam. The term "heterocyclo" is also meant to include groups having fused optionally substituted aryl groups, e.g., indolinyl. In one embodiment, the heterocyclo group is chosen from a 5- or 6-membered cyclic group containing one ring and one or two oxygen and/or nitrogen atoms. The heterocyclo can be optionally linked to the rest of the molecule through a carbon or nitrogen atom. Non-limiting exemplary heterocyclo groups include 2-imidazolidinone, piperidinyl, morpholinyl, piperazinyl, pyrrolidinyl, and indolinyl.

Also as used herein, the term "optionally substituted heterocyclo" as used herein by itself or part of another group means the heterocyclo as defined above is either unsubstituted or substituted with one to four substituents independently selected from halo, nitro, cyano, hydroxy, amino, alkylamino, dialkylamino, haloalkyl, hydroxyalkyl, alkoxy, haloalkoxy, aryloxy, aralkyloxy, alkylthio, carboxamido, sulfonamido, alkylcarbonyl, arylcarbonyl, alkylsulfonyl, arylsulfonyl, ureido, guanidino, carboxy, carboxyalkyl, alkyl, cycloalkyl, alkenyl, alkynyl, aryl, heteroaryl, heterocyclo, alkoxyalkyl, (amino)alkyl, hydroxyalkylamino, (alkylamino)alkyl, (dialkylamino)alkyl, (cyano)alkyl, (carboxamido)alkyl, mercaptoalkyl, (heterocyclo)alkyl, (heteroaryl)alkyl, and the like. Substitution may occur on any available carbon or nitrogen atom, and may form a spirocycle. Non-limiting exemplary optionally substituted heterocyclo groups include:

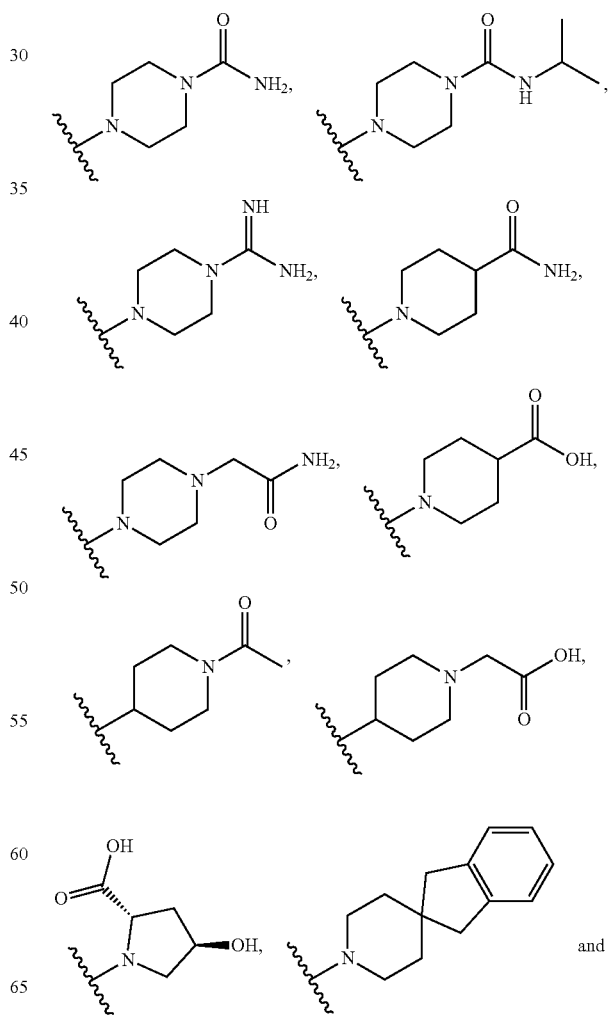

and

-continued

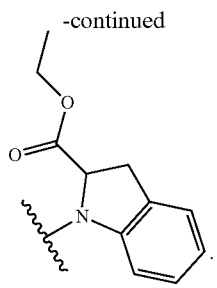

Also as used herein, the term "amino" as used by itself or as part of another group refers to —NH$_2$.

Also as used herein, the term "alkylamino" as used by itself or as part of another group refers to —NHR$^{15}$, wherein R$^{15}$ is alkyl.

Also as used herein, the term "dialkylamino" as used by itself or as part of another group refers to —NR$^{16a}$R$^{16b}$, wherein R$^{16a}$ and R$^{16b}$ are each independently alkyl or R$^{16a}$ and R$^{16b}$ are taken together to form a 3- to 8-membered optionally substituted heterocyclo.

Also as used herein, the term "hydroxyalkylamino" as used by itself or as part of another group refers to —NHR$^{17}$, wherein R$^{17}$ is hydroxyalkyl.

Also as used herein, the term "(amino)alkyl" as used by itself or as part of another group refers to an alkyl group substituted with an amino group. Non-limiting exemplary amino alkyl groups include —CH$_2$CH$_2$NH$_2$, —CH$_2$CH$_2$CH$_2$NH$_2$, —CH$_2$CH$_2$CH$_2$CH$_2$NH$_2$, and the like.

Also as used herein, the term "(alkylamino)alkyl" as used by itself or as part of another group refers alkyl group substituted an alkylamino group. A non-limiting exemplary (alkylamino)alkyl group is —CH$_2$CH$_2$N(H)CH$_3$.

Also as used herein, the term "(dialkylamino)alkyl" as used by itself or as part of another group refers to an alkyl group substituted by a dialkylamino group. A non-limiting exemplary (dialkylamino)alkyl group is —CH$_2$CH$_2$N(CH$_3$)$_2$.

Also as used herein, the term "(cyano)alkyl" as used by itself or as part of another group refers to an alkyl group substituted with one or more cyano, e.g., —CN, groups. Non-limiting exemplary (cyano)alkyl groups include —CH$_2$CH$_2$CN, —CH$_2$CH$_2$CH$_2$CN, and —CH$_2$CH$_2$CH$_2$CH$_2$CN.

Also as used herein, the term "carboxamido" as used by itself or as part of another group refers to a radical of formula —C(=O)NR$^{24a}$R$^{24b}$, wherein R$^{24a}$ and R$^{24b}$ are each independently hydrogen, optionally substituted alkyl, optionally substituted aryl, or optionally substituted heteroaryl, or R$^{24a}$ and R$^{24b}$ taken together with the nitrogen to which they are attached from a 3- to 8-membered heterocyclo group. In one embodiment, R$^{24a}$ and R$^{24b}$ are each independently hydrogen or optionally substituted alkyl. Non-limiting exemplary carboxamido groups include —CONH$_2$, —CON(H)CH$_3$, —CON(CH$_3$)$_2$, and —CON(H)Ph.

Also as used herein, the term "(carboxamido)alkyl" as used by itself or as part of another group refers to an alkyl group with a carboxamido group. Non-limiting exemplary (carboxamido)alkyl groups include —CH$_2$CONH$_2$, —C(H)CH$_3$—CONH$_2$, and —CH$_2$CON(H)CH$_3$.

Also as used herein, the term "sulfonamido" as used by itself or as part of another group refers to a radical of the formula —SO$_2$NR$^{23a}$R$^{23b}$ wherein R$^{23a}$ and R$^{23b}$ are each independently hydrogen, optionally substituted alkyl, or optionally substituted aryl, or R$^{23a}$ and R$^{23b}$ taken together with the nitrogen to which they are attached from a 3- to 8-membered heterocyclo group. Non-limiting exemplary sulfonamido groups include —SO$_2$NH$_2$, —SO$_2$N(H)CH$_3$, and —SO$_2$N(H)Ph.

Also as used herein, the term "alkylcarbonyl" as used by itself or as part of another group refers to a carbonyl group, i.e., —C(=O)—, substituted by an alkyl group. A non-limiting exemplary alkylcarbonyl group is —COCH$_3$.

Also as used herein, the term "arylcarbonyl" as used by itself or as part of another group refers to a carbonyl group, i.e., —C(=O)—, substituted by an optionally substituted aryl group. A non-limiting exemplary arylcarbonyl group is —COPh.

Also as used herein, the term "alkylsulfonyl" as used by itself or as part of another group refers to a sulfonyl group, i.e., —SO$_2$—, substituted by any of the above-mentioned optionally substituted alkyl groups. A non-limiting exemplary alkylsulfonyl group is —SO$_2$CH$_3$.

Also as used herein, the term "arylsulfonyl" as used by itself or as part of another group refers to a sulfonyl group, i.e., —SO$_2$—, substituted by any of the above-mentioned optionally substituted aryl groups. A non-limiting exemplary arylsulfonyl group is —SO$_2$Ph.

Also as used herein, the term "mercaptoalkyl" as used by itself or as part of another group refers to any of the above-mentioned alkyl groups substituted by a —SH group.

Also as used herein, the term "carboxy" as used by itself or as part of another group refers to a radical of the formula —COOH.

Also as used herein, the term "carboxyalkyl" as used by itself or as part of another group refers to any of the above-mentioned alkyl groups substituted with a —COOH. A non-limiting exemplary carboxyalkyl group is —CH$_2$CO$_2$H.

Also as used herein, the term "aralkyl" as used by itself or as part of another group refers to an alkyl group substituted with one, two, or three optionally substituted aryl groups. In one embodiment, the aralkyl group is a C$_{1-4}$ alkyl substituted with one optionally substituted aryl group. Non-limiting exemplary aralkyl groups include benzyl, phenethyl, —CHPh$_2$, and —CH(4-FPh)$_2$.

Also as used herein, the term "ureido" as used by itself or as part of another group refers to a radical of the formula —NR$^{22a}$C(=O)NR$^{22b}$R$^{22c}$, wherein R$^{22a}$ is hydrogen, alkyl, or optionally substituted aryl, and R$^{22b}$ and R$^{22c}$ are each independently hydrogen, alkyl, or optionally substituted aryl, or R$^{22b}$ and R$^{22c}$ taken together with the nitrogen to which they are attached form a 4- to 8-membered heterocyclo group. Non-limiting exemplary ureido groups include —NHC(=O)NH$_2$ and —NHC(=O)NHCH$_3$.

Also as used herein, the term "guanidino" as used by itself or as part of another group refers to a radical of the formula —NR$^{25a}$C(=NR$^{26}$)NR$^{25b}$R$^{25c}$, wherein R$^{25a}$, R$^{25b}$, and R$^{25c}$ are each independently hydrogen, alkyl, or optionally substituted aryl, and R$^{26}$ is hydrogen, alkyl, cyano, alkylsulfonyl, alkylcarbonyl, carboxamido, or sulfonamido. Non-limiting exemplary guanidino groups include —NHC(=NH)NH$_2$, —NHC(=NCN)NH$_2$, —NHC(=NH)NHCH$_3$, and the like.

Also as used herein, the term "(heterocyclo)alkyl" as used by itself or as part of another group refers to an alkyl group substituted with one, two, or three optionally substituted heterocyclo groups. In one embodiment, the (heterocyclo)

alkyl is a $(C_{1-4})$alkyl substituted with one optionally substituted heterocyclo group. Non-limiting exemplary (heterocyclo)alkyl groups include:

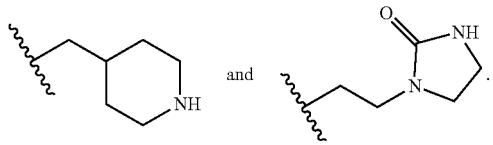 [SMILES: *CC1CCNCC1 ; *CCN1CCNC1=O]

Also as used herein, the term "(heteroaryl)alkyl" as used by itself or as part of another group refers to an alkyl group substituted with one, two, or three optionally substituted heteroaryl groups. In one embodiment, the (heteroaryl)alkyl group is a $(C_{1-4})$alkyl substituted with one optionally substituted heteroaryl group. Non-limiting exemplary (heteroaryl)alkyl groups include:

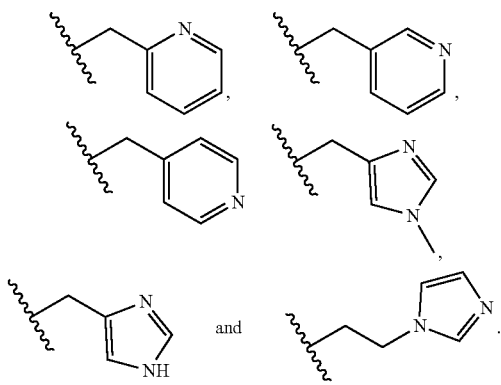

Also as used herein, the term "about," as used in connection with a measured quantity, refers to the normal variations in that measured quantity, as expected by the skilled artisan making the measurement and exercising a level of care commensurate with the objective of measurement and the precision of the measuring equipment.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
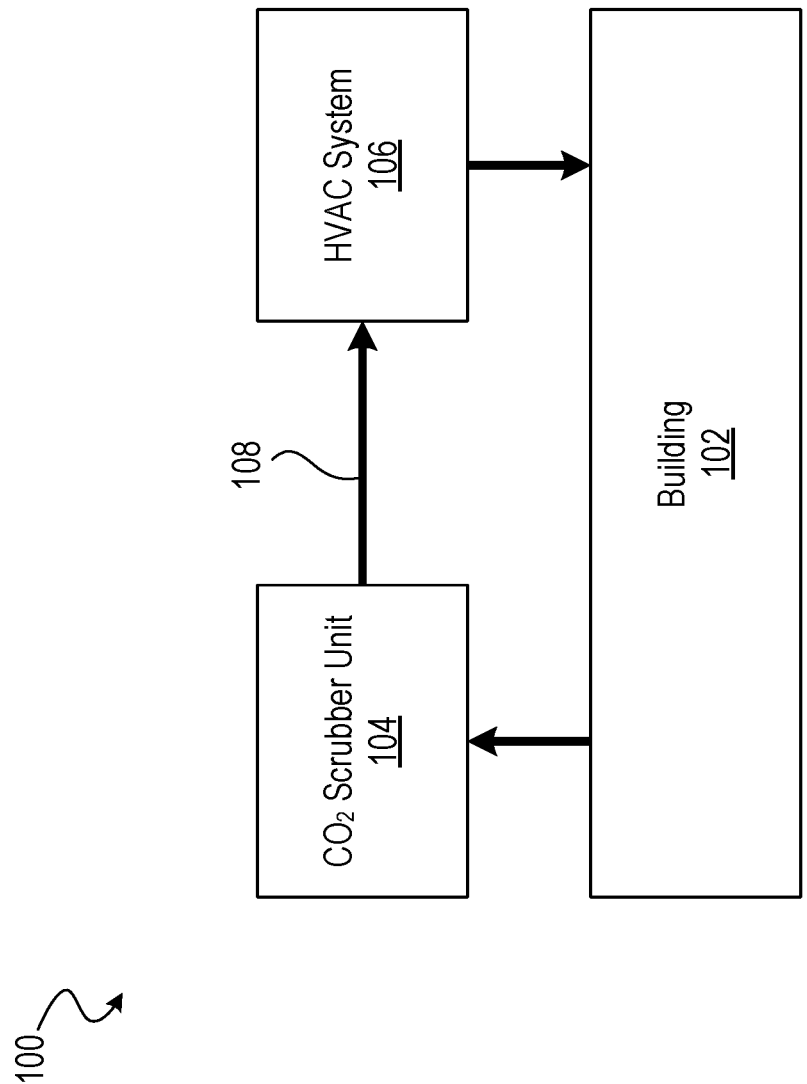
FIG. 1 depicts an illustrative air-flow system in accordance with an embodiment of the disclosure.

The embodiments described herein relate to sorbents for adsorbing carbon dioxide and/or volatile organic compounds (VOCs), such as formaldehyde. The sorbents may be incorporated into heating, ventilation, and air-conditioning (HVAC) systems, which leverage the sorbents' high adsorption capacity and durability to reduce energy consumption in commercial office buildings. Utilizing a solid $CO_2$ sorbent in a $CO_2$ scrubber unit of an HVAC system allows for a decrease in frequency of ventilation to reduce indoor $CO_2$ concentration level by dilution with outside air, thus reducing energy consumption. The sorbents may simultaneously adsorb $CO_2$ and VOCs, such as formaldehyde, even in the presence of high humidity conditions.

Other systems that utilize the sorbents described herein include air purification systems in residential and commercial buildings, automobile cabin air HVAC systems, car cabin air purifiers, and environmental control systems for purifying aircraft cabin air. In certain embodiments, an adsorbent described herein may be incorporated into a paint, and is capable of adsorbing formaldehyde out of an enclosed room in which the paint has been applied. In certain embodiments, an adsorbent described herein may be incorporated into a food storage system, such as packaging or a cargo container.

Certain embodiments of the present disclosure relate to $CO_2$ sorbents which have high $CO_2$ adsorption capacity, high stability against repeated usage (thermal/aging stability), and high attrition resistance. The adsorption of $CO_2$ occurs at typical indoor air condition (e.g., between 20° C. and 30° C. at 1000 ppm $CO_2$), and the desorption occurs at typical outdoor air condition in hot climate area such as Texas (e.g., between 40° C. and 50° C. at 400 ppm $CO_2$). An illustrative sorbent is composed of one or more amine compounds that act as active gas-adsorbing components and a porous support that serve as a high surface area support for the amine compounds. In some embodiments, sorbents contain polyamines that provide high adsorption efficiency, as well as porous materials with high pore volume and surface area for amine loading. In some embodiments, granules are used due to less pressure drop and ease of handling when incorporated into an air filtration system. The polyamine allows the sorbent to be regenerated at higher temperatures, for example, up to 90° C.

Although the sorbents are often referred to throughout this application as "$CO_2$ sorbents", it is to be understood that such sorbents may be capable of adsorbing other compounds as well, such as VOCs, unless otherwise specified.

Certain embodiments of the present disclosure relate to a method of producing a polyamine from a reaction of an amine compound, such as pentaethylenehexamine, and dimethylcarbonate. Such embodiments are an improvement upon synthesis methods that utilize formaldehyde. Advantages include the elimination of formaldehyde contaminants from the sorbent and higher $CO_2$ adsorption capacities. The polyamine may be impregnated onto a porous support, such as a silica powder. Other porous supports may also be used, such as clay supports.

In some embodiments, the porous support may have a silicon-based coating formed thereon. As used herein, the term "silicon-based coating" refers to a coating layer that comprises silicon, such as silica, colloidal silica, or sodium silicate.

Figure 2:
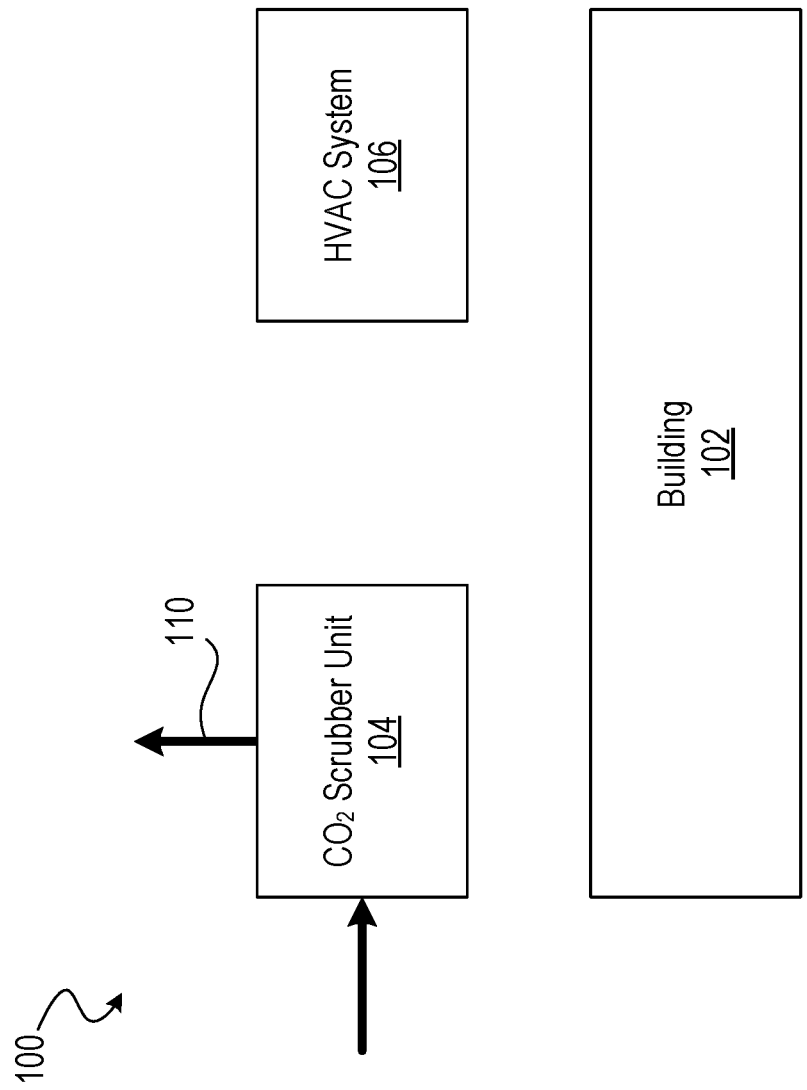
FIG. 2 depicts an illustrative air-flow system in accordance with another embodiment of the disclosure.

FIGS. 1-2 depict an illustrative air-flow system 100 in accordance with an embodiment of the disclosure. The system 100 includes a $CO_2$ scrubber unit 104 and an HVAC system 106 installed as part of a building 102. As shown in FIG. 1, the $CO_2$ scrubber unit 104 and the HVAC system 106 are fluidly coupled to each other and to the interior air space of the building 102 such that a recirculation air flow path 108 is established. As $CO_2$ accumulates within the interior air space of the building 102, interior air is recirculated through the $CO_2$ scrubber unit 104 to adsorb the excess $CO_2$ using a $CO_2$ sorbent. Treated air then passes through the HVAC system 106, which is further filtered (e.g., to remove dust and other particulates) and may be heated or cooled before being recirculated back into the building 102.

As shown in FIG. 2, the $CO_2$ scrubber unit 104 may utilize a purging process to purge adsorbed $CO_2$ from the $CO_2$ sorbent. In certain embodiments, a purging air flow path 110 is established to draw in external (outside) air having a low $CO_2$ concentration. The $CO_2$ scrubber may apply heat (e.g., using a heating element) to the $CO_2$ sorbent to promote desorption of the adsorbed $CO_2$ into the purging air flow path 110 and to the external environment. In some embodiments, the $CO_2$ scrubber may utilize hot external air (e.g., 40° C. to 50° C. air) alone or in combination with applying heat to the $CO_2$ sorbent. In some embodiments, only one of air flow paths 108 and 110 are established at any given time. In some embodiments, the purge process may occur while recirculated air is still flowing. For example, the $CO_2$ scrubber unit 104 may divert recirculated air received from the building 102 such that it flows into the HVAC system 106 without contacting the sorbent, while the purging air flow path 110 is used to regenerate the sorbent (e.g., $CO_2$ desorption). In some embodiments, the $CO_2$ scrubber unit 104 may include multiple sorbents and may define multiple air flow paths. For example, the $CO_2$ scrubber unit 104 may treat $CO_2$ of recirculated air by a first sorbent, while simultaneously regenerating a second sorbent that is isolated from the recirculated air. Once the second sorbent is regenerated, it may be placed in contact with the recirculated air along with the first sorbent. The first sorbent may later be isolated from the recirculated air to be regenerated by the purging process.

The $CO_2$ sorbent may be in the form of granules, such as spherical pellets, cubic pellets, disks, extrudates, beads, powders, or any other suitable shape. In some embodiments, an average size of the granules ranges from about 0.25 mm to about 5 mm. In some embodiments, the average size ranges from 0.25 mm to 2.4 mm. In some embodiments, other sizes may be utilized. In some embodiments, the granules may be loaded into cartridges, which may be subsequently loaded/stacked within a $CO_2$ scrubber unit. In some embodiments, the sorbent may be in a form of porous ceramic honeycomb, metallic honeycomb, or polymeric foam having a sorbent washcoated thereon (e.g., a washcoat of a polyamine impregnated powder, such as a silica powder).

It is noted that the system may be adapted for other air purification applications. For example, the sorbent may be incorporated into an environmental control system of an aircraft, or an automobile cabin.

Figure 3:
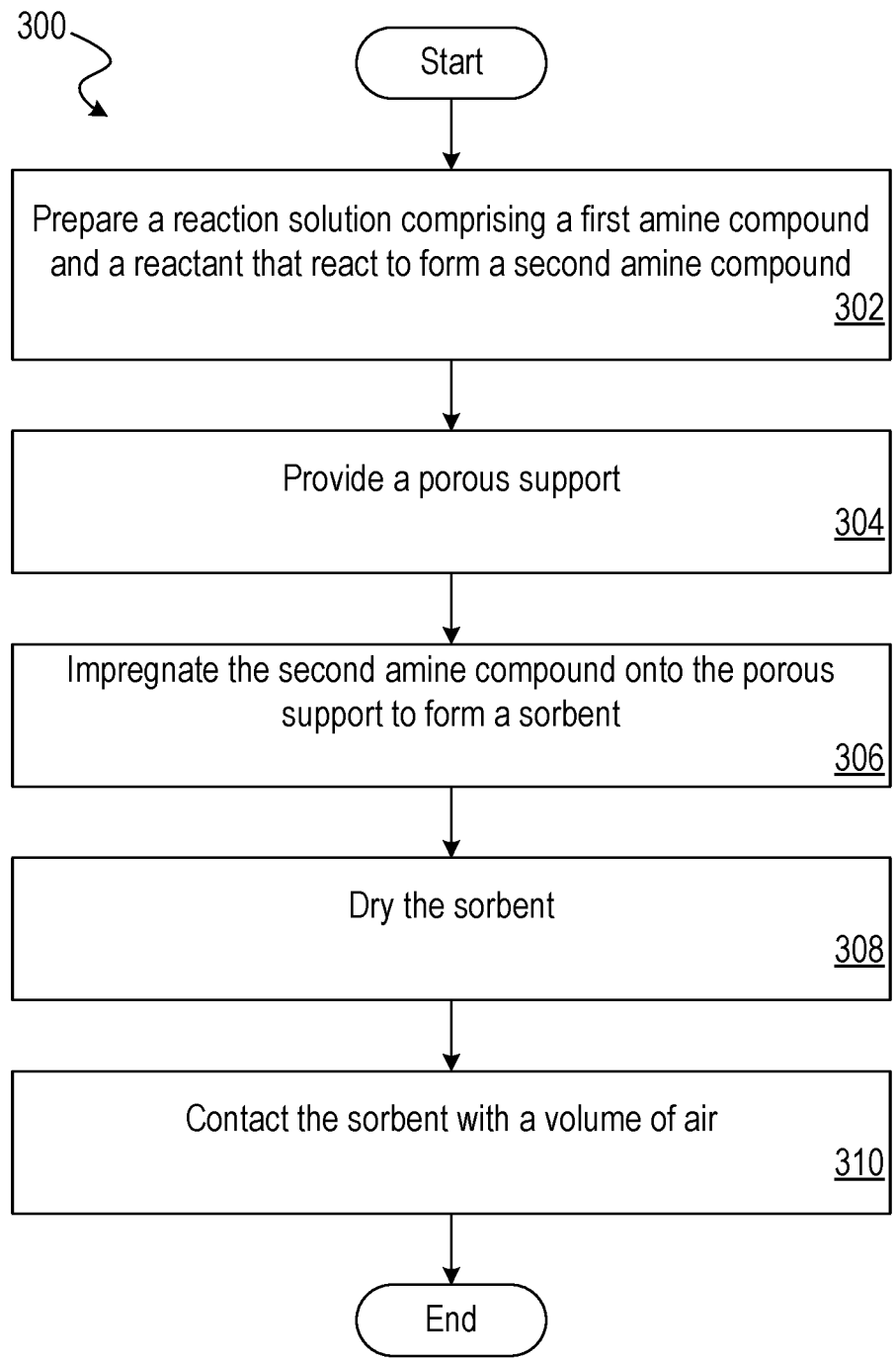
FIG. 3 is a flow diagram illustrating a method for producing a $CO_2$ sorbent in accordance with an embodiment of the disclosure.

FIG. 3 is a flow diagram illustrating a method 300 for producing a $CO_2$ sorbent in accordance with an embodiment of the disclosure. FIG. 3 begins at block 302, where a reaction solution is prepared. The reaction solution comprises a first amine compound and a reactant, which react to form a second amine compound (e.g., a polyamine) In certain embodiments, the reaction solution is free of aldehyde (e.g., formaldehyde) such that the second amine compound is synthesized in an aldehyde-free reaction.

The first amine compound includes a first number of amine moieties, which may include one or more of primary, secondary, or tertiary amines. For example, the first amine compound may comprise one or more of pentaethylenehexamine, diethanolamine, tetraethylenepentamine, triethylenetetramine, tetraethylenepentamine, bis(2-hydroxypropyl)amine, N,N'-bis(2-hydroxyethyl)ethylenediamine, monoethanolamine, diisopropanolamine, alkylamines, methylamine, linear polyethyleneimine, branched polyethyleneimine, dimethylamine, diethylamine, methyldiethanolamine, methylethanolamine, or polyethylene, with any combination of such amines being contemplated. As used herein, the term "compound" refers to one or more molecules of a unique chemical structure. For example, a solution having a first amine compound may contain that first amine compound at a first concentration. Also as used herein, the term "polyamine" refers to a compound having more than one amine moiety.

Other amine compounds include, but are not limited to, triethylenetetramine, tetraethylenepentamine, bis(2-hydroxypropyl)amine, N,N'-bis(2-hydroxyethyl)ethylenediamine, monoethanolamine, diisopropanolamine, alkylamines, methylamine, polyethyleneimine (branched or linear), dimethylamine, diethylamine, methyldiethanolamine, methylethanolamine, and polyethylene.

In certain embodiments, the reactant comprises a carbonate ester compound or a ketone compound. In one embodiment, the carbonate ester compound is of a formula:

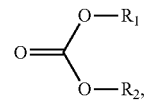

wherein $R_1$ and $R_2$ are independently selected from hydrogen, halogen, alkanoyl, alkyl, optionally substituted alkyl, cycloalkyl, optionally substituted cycloalkyl, alkenyl, optionally substituted alkenyl, cycloalkenyl, optionally substituted cycloalkenyl, alkynyl, optionally substituted alkynyl, hydroxy, aryl, optionally substituted aryl, aralkyl, (heterocyclo)alkyl, (heteroaryl)alkyl, (amino)alkyl, (alkylamino)alkyl, (dialkylamino)alkyl, (carboxamido)alkyl, (cyano)alkyl, alkoxyalkyl, and hydroxyalkyl. In certain embodiments, $R_1$ comprises $C_nH_{2n+1}$, wherein $R_2$ comprises $C_mH_{2m+1}$, wherein n is an integer from 1 to 18, and wherein m is an integer from 1 to 18. In certain embodiments, the reactant is an alkyl carbonate, which may include one or more of a dimethyl carbonate, diethyl carbonate, or another alkyl carbonate.

In certain embodiments, the reactant comprises a ketone. The ketone may comprise one or more of acetone, benzoin, ninhydrin, benzophenone, benzoin methyl ether, butanone, pentanone, hexanone, heptanone, methyl acetoacetate, or ethyl acetoacetate. In certain embodiments, the reactant comprises both a carbonate ester and a ketone.

At block 304, a porous support (e.g., a plurality of porous particles) is provided. The porous support may serve as a high surface area porous support for impregnation with a gas-adsorbing material, such as a polyamine. In certain embodiments, the porous support includes clay particles (e.g., bentonite, attapulgite, kaolinite, montmorillonite, ball clay, fuller's earth, hectorite, palygorskite, saponite, sepiolite, halloysite, other clay materials, or combinations thereof). In certain embodiments, the porous support includes silica, calcium sulfate, zeolite, synthetic zeolite, alumina, titania, fumed silica, activated carbon, activated charcoal, metal organic framework, other types of porous materials, or combinations thereof.

In certain embodiments, the porous support includes a plurality of porous particles, such as granules. In certain embodiments, an average size of the particles/granules ranges from about 0.25 mm to about 5 mm. In certain embodiments, the average size ranges from about 0.25 mm to about 2.4 mm.

In certain embodiments, the porous support includes a plurality of porous particles in a powder form. In certain embodiments, an average size of the particles/powder ranges from about 1.0 µm to about 100 µm. In certain embodiments, the average size ranges from about 5.0 µm to about 50 µm.

In certain embodiments, a surface area (e.g., Langmuir surface area) of the porous support is greater than 10 $m^2/g$ prior to impregnation with the polyamine. In certain embodiments, the surface area is greater than 50 $m^2/g$. In certain embodiments, the surface area is greater than 100 $m^2/g$. In certain embodiments, the surface area is greater than 10 $m^2/g$ and less than 5000 $m^2/g$. In certain embodiments, the surface area is greater than 25 $m^2/g$ and less than 1000 $m^2/g$. In certain embodiments, the surface area is greater than 50 $m^2/g$ and less than 500 $m^2/g$. In certain embodiments, the surface area is greater than 75 $m^2/g$ and less than 300 $m^2/g$. In certain embodiments, the surface area is greater than 100 $m^2/g$ and less than 120 $m^2/g$. In certain embodiments, the surface area is greater than 200 $m^2/g$. In certain embodiments, the surface area is greater than 200 $m^2/g$ and less than 500 $m^2/g$. In certain embodiments, the surface area is greater than 200 $m^2/g$ and less than 400 $m^2/g$. In certain embodiments, the surface area is greater than 200 $m^2/g$ and less than 300 $m^2/g$ prior. In certain embodiments, after applying a silicon-based coating to the porous support, a surface area of the support increases by at least 5%, at least 10%, at least 20%, at least 30%, from 5% to 40%, from 10% to 40%, or from 20% to 40%.

The surface area of the porous support may be determined by the Brunauer-Emmett-Teller (BET) method according to DIN ISO 9277:2003-05 (which is a revised version of DIN 66131). The specific surface area is determined by a multi-point BET measurement in the relative pressure range from 0.05-0.3 $p/p_0$.

In certain embodiments, an average pore volume (e.g., Barrett-Joyner-Halenda (BJH) pore volume) of the porous support is greater than 0.1 mL/g and less than 3.0 mL/g. In certain embodiments, the average pore volume is greater than 0.2 mL/g and less than 2.0 mL/g. In certain embodiments, the average pore volume is greater than 0.5 mL/g and less than 1.5 mL/g. In certain embodiments, the average pore volume is greater than 0.8 mL/g and less than 1.2 mL/g. In certain embodiments, after applying a silicon-based coating to the porous support, an average pore volume of the support decreases by at most 7%, at most 10%, at most 15%, at most 20%, at most 25%, 5% to 10%, 5% to 20%, or 5% to 25%.

In certain embodiments, an average pore radius (e.g., BET pore radius) of the porous support is greater than 10 angstroms and less than 300 angstroms. In certain embodiments, the average pore radius is greater than 15 angstroms and less than 250 angstroms. In certain embodiments, the average pore radius is greater than 20 angstroms and less than 200 angstroms. In certain embodiments, the average pore radius is greater than 50 angstroms and less than 200 angstroms. In certain embodiments, the average pore radius is greater than 100 angstroms and less than 200 angstroms. In certain embodiments, the average pore radius is greater than 120 angstroms and less than 200 angstroms. In certain embodiments, after applying a silicon-based coating to the porous support, an average pore radius of the support decreases by at most 10%, at most 15%, at most 20%, 10% to 30%, 15% to 25%, 10% to 20%, or 20% to 30%.

In order to increase capacity of the porous support utilized in the embodiments of the present disclosure, the porous support can be activated. The activation may include subjecting the porous support (e.g., particles) to various conditions including, but not limited to, ambient temperature, vacuum, an inert gas flow, or any combination thereof, for a sufficient time to activate the porous particles. In some embodiments, the porous support may be activated by calcining. In certain embodiments, activation may be performed before coating the support with the silicon-based coating, after coating the support with the silicon-based coating, and/or after impregnation with amine compounds.

In certain embodiments, the activation includes the removal of water molecules from the adsorption sites. In other embodiments, the activation includes the removal of non-aqueous solvent molecules from the adsorption sites that are residual from the manufacture of the porous support. In still further embodiments, the activation includes the removal of sulfur compounds or higher hydrocarbons from the adsorption sites. In embodiments utilizing an inert gas purge in the activation process, a subsequent solvent recovery step is also contemplated. In certain embodiments, the contaminants (e.g., water, non-aqueous solvents, sulfur compounds or higher hydrocarbons) are removed from the porous support at a molecular level.

In certain embodiments, the porous support is calcined prior to impregnation with the gas-adsorbing material (e.g., before and/or after forming the silicon-based coating). Calcining may be performed at a temperature between 400° C. and 600° C. in certain embodiments, between 540° C. and 580° C. in other embodiments, or between 100° C. and 150° C. in other embodiments.

In some embodiments, a silicon-based coating is formed on the porous support to form a porous support (e.g., a silica-coated support). In certain embodiments, the porous support is treated with an aqueous solution containing tetraethylorthosilicate (TEOS). In certain embodiments, the porous support is incubated with the TEOS at a temperature from 50° C. to 70° C. (e.g., 60° C.) for 1 hour to 3 hours. In other embodiments, the porous support may be treated with other materials, such as colloidal silica or sodium silicate. The silicon-based coating may be formed under various conditions including, but not limited to, ambient temperature, vacuum, an inert gas flow, or any combination thereof.

At block 306, the second amine compound is impregnated onto the porous support to form the sorbent, for example, by mixing with a solution containing the second amine compound with the porous support. In some embodiments, the reaction solution is mixed with the porous support after the second amine compound is formed. The porous support may become impregnated with the second amine compound (e.g., via incipient wetness impregnation). The impregnation may occur under various conditions including, but not limited to, ambient temperature, varying atmospheric conditions (e.g., under air, under nitrogen atmosphere, under vacuum, or under low pressure nitrogen atmosphere), an inert gas flow, or any combination thereof.

At block 308, the sorbent is dried. At block 310, the sorbent is contacted with a volume of air, and is adapted to adsorb a gas from the volume of air. In some embodiments, the gas is $CO_2$. In some embodiments, other gases may be adsorbed (e.g., volatile organic compounds) in addition to or in lieu of $CO_2$.

In certain embodiments, after drying, a weight percent of one or more amine compounds impregnated onto the porous support ranges from 20% and 60% of a total weight of the sorbent, from 30% to 50% of the total weight of the sorbent, or from 38% to 45% of the total weight of the sorbent. In certain embodiments, a weight percent of organic content (including amine compounds and other additives) ranges from 20% and 60% of a total weight of the sorbent, from 30% to 50% of the total weight of the sorbent, or from 38% to 45% of the total weight of the sorbent, and a weight percent of the porous support ranges from 40% and 80% of a total weight of the sorbent, from 50% to 70% of the total weight of the sorbent, or from 55% to 62% of the total weight of the sorbent.

In some embodiments, a $CO_2$ adsorption capacity of the sorbent is greater than 20 g/L when the sorbent is maintained at a temperature greater than 20° C. and less than 40° C. (adsorption of $CO_2$), and then the sorbent is maintained at a temperature greater than 45° C. and less than 55° C. (desorption of $CO_2$). In some embodiments, a $CO_2$ adsorption capacity of the sorbent is greater than 15 g/L when the sorbent is maintained at a temperature greater than 20° C. and less than 40° C. (adsorption of $CO_2$), and then the sorbent is maintained at a temperature greater than 45° C. and less than 55° C. (desorption of $CO_2$). In some embodiments, a $CO_2$ adsorption capacity of the sorbent is greater than 10 g/L when the sorbent is maintained at a temperature greater than 20° C. and less than 40° C. (adsorption of $CO_2$), and then the sorbent is maintained at a temperature greater than 45° C. and less than 55° C. (desorption of $CO_2$). In some embodiments, a $CO_2$ adsorption capacity of the sorbent is greater than 5 g/L when the sorbent is maintained at a temperature greater than 20° C. and less than 40° C. (adsorption of $CO_2$), and then the sorbent is maintained at a temperature greater than 45° C. and less than 55° C. (desorption of $CO_2$).

In some embodiments, a $CO_2$ adsorption capacity of the sorbent is greater than 40 g/L when the sorbent is maintained at a temperature greater than 20° C. and less than 40° C. (adsorption of $CO_2$), and then the sorbent is maintained at a temperature greater than 60° C. and less than 70° C. (desorption of $CO_2$). In some embodiments, a $CO_2$ adsorption capacity of the sorbent is greater than 30 g/L when the sorbent is maintained at a temperature greater than 20° C. and less than 40° C. (adsorption of $CO_2$), and then the sorbent is maintained at a temperature greater than 60° C. and less than 70° C. (desorption of $CO_2$). In some embodiments, a $CO_2$ adsorption capacity of the sorbent is greater than 20 g/L when the sorbent is maintained at a temperature greater than 20° C. and less than 40° C. (adsorption of $CO_2$), and then the sorbent is maintained at a temperature greater than 60° C. and less than 70° C. (desorption of $CO_2$). In some embodiments, a $CO_2$ adsorption capacity of the sorbent is greater than 10 g/L when the sorbent is maintained at a temperature greater than 20° C. and less than 40° C. (adsorption of $CO_2$), and then the sorbent is maintained at a temperature greater than 60° C. and less than 70° C. (desorption of $CO_2$).

In some embodiments, a $CO_2$ adsorption capacity of the sorbent is greater than 0.7 wt %, greater than 0.8 wt %, greater than 0.9 wt %, greater than 1.0 wt %, greater than 1.1 wt %, greater than 1.2 wt %, greater than 1.3 wt %, greater than 1.4 wt %, 1.5 wt %, greater than 1.6 wt %, greater than 1.7 wt %, greater than 1.8 wt %, greater than 1.9 wt %, greater than 2.0 wt %, greater than 2.1 wt %, greater than 2.2 wt %, greater than 2.3 wt %, greater than 2.4 wt %, or greater than 2.5 wt % when computed as a weight of adsorbed $CO_2$ versus a weight of the sorbent.

Figure 4:
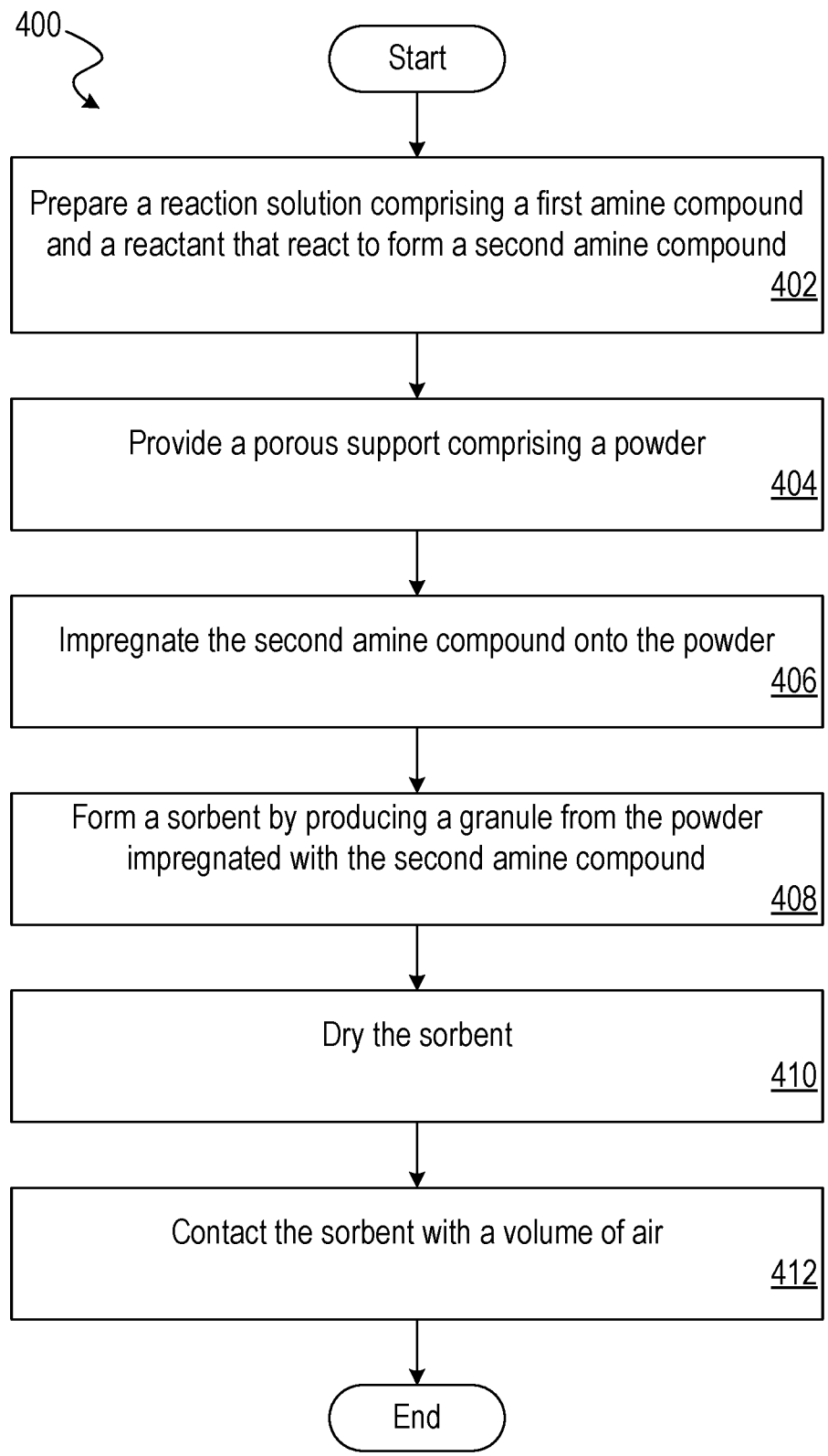
FIG. 4 is a flow diagram illustrating another method for producing a $CO_2$ sorbent in accordance with an embodiment of the disclosure.

FIG. 4 is a flow diagram illustrating another method 400 for producing a $CO_2$ sorbent in accordance with an embodiment of the disclosure. FIG. 4 begins at block 402, where a reaction solution is prepared. The reaction solution may be prepared in a similar fashion as described with respect to block 302.

At block 404, a porous support is provided. The porous support may comprise a powder. For example, the powder may be a silica powder. In certain embodiments, an average size of the powder ranges from about 1.0 μm to about 100 μm, or from about 5.0 μm to about 50 μm.

At block 406, the second amine compound is impregnated onto the powder, for example, in a similar fashion as described with respect to block 306.

At block 408, a sorbent is formed by producing a granule from the powder impregnated with the second amine compound. In certain embodiments, the sorbent is formed by charging the powder equipment for non-pressure agglomeration (including disc pelletizers, rotary drums, pin mixers, paddle mixers, etc.) or for pressure agglomeration (including compactors, briquettes, etc.).

Blocks 410 and 412 may be performed in a similar fashion as described with respect to blocks 308 and 310, respectively.

Figure 5:
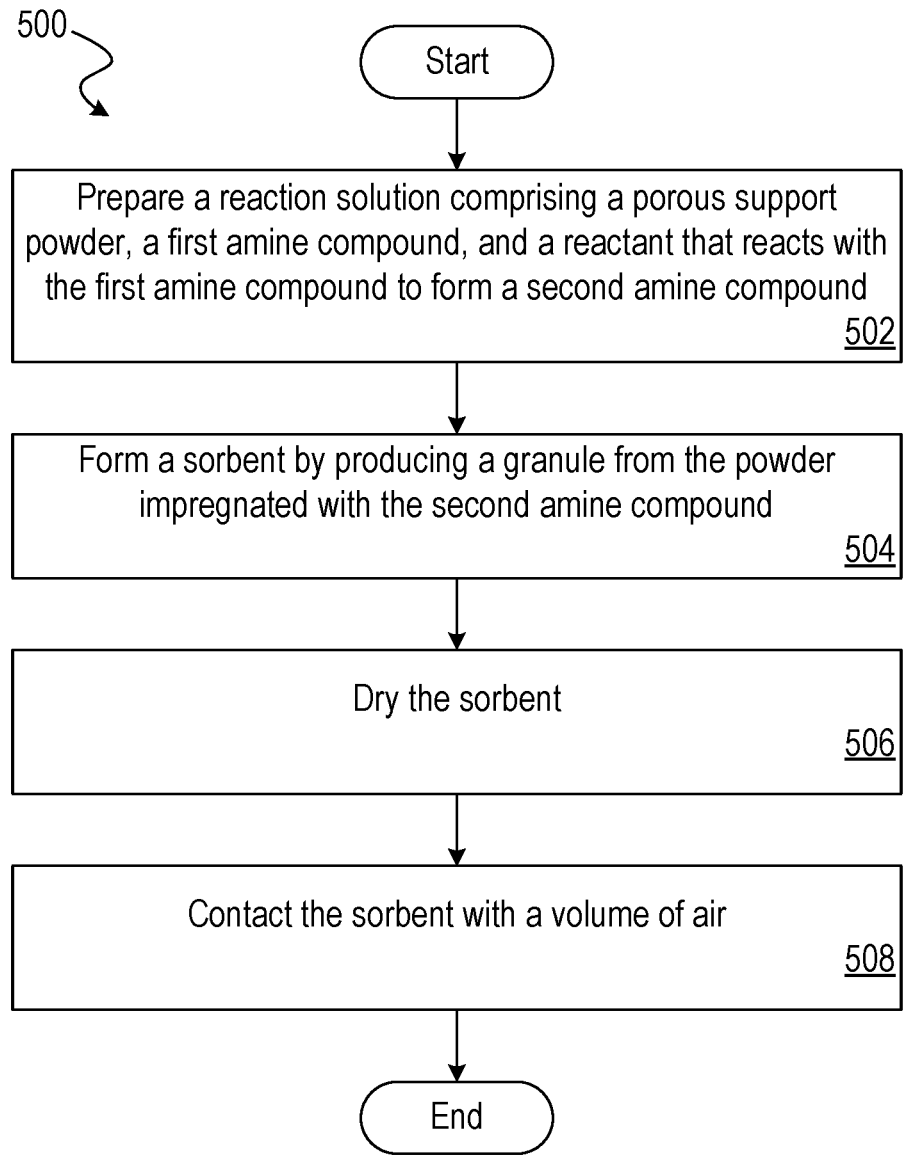
FIG. 5 is a flow diagram illustrating another method for producing a $CO_2$ sorbent in accordance with an embodiment of the disclosure.

FIG. 5 is a flow diagram illustrating another method 500 for producing a $CO_2$ sorbent in accordance with an embodiment of the disclosure. FIG. 5 begins at block 502, where a reaction solution is prepared that comprises various components including a porous support (e.g., a powder), a first amine compound, and a reactant, which results in the formation of a second amine compound and impregnation of the second amine compound onto the porous support. The reaction solution may be prepared in a similar fashion as described with respect to block 302, except that the reaction may be formed in the presence of a porous support (e.g., a powder). For example, a porous support may be simultaneously mixed with the first amine compound and the reactant, or one or more of the components may be charged into a reaction volume in series or parallel. In one embodiment, the reactant may be mixed with the first amine compound, followed by charging of the porous support into the reaction solution. In another embodiment, the first amine compound may be mixed with the porous support, followed by the addition of the reactant.

At block 504, a sorbent is formed by producing a granule from the powder impregnated with the second amine compound, for example, in a similar fashion described with respect to block 408. In some embodiments, blocks 504 and 502 may be performed simultaneously.

Blocks 506 and 508 may be performed in a similar fashion as described with respect to blocks 308 and 310, respectively.

In certain embodiments, the resulting sorbents formed according to any of methods 300, 400, or 500 were formed having an average size from about 0.25 mm to about 5.0 mm; a BET average surface area from 5 $m^2/g$ to 100 $m^2/g$; a BJH average pore volume from 0.1 cc/g to 1.0 cc/g; and a BET average pore radius from 100 angstroms to 300 angstroms. A weight percent of one or more amine compounds impregnated onto the porous support ranges from 20% to 60% of a total weight of the sorbent.

It is noted that the blocks of methods 300, 400, and 500 are not limiting, and that, in some embodiments, some or all of the blocks of their respective methods may be performed. In some embodiments, one or more of the blocks may be performed substantially simultaneously. Some blocks may be omitted entirely or repeated.

ILLUSTRATIVE EXAMPLES

The following examples are set forth to assist in understanding the disclosure and should not, of course, be construed as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein.

Example 1: Polyamine Synthesis

A polyamine batch was synthesized as follows. A pentaethylenehexamine (PEHA) solution was prepared by placing 50 g (0.22 mol) of PEHA into a 1 L vessel with 75 g of deionized water. A reaction solution was then prepared by stirring the PEHA solution magnetic stirrer while adding 9.9 g (0.11 mol), 19.8 g (0.22 mol), 39.6 g (0.44 mol), or 59.4 g (0.66 mol) of dimethyl carbonate (DMC) to achieve solutions having 1:05, 1:1, 1:2, or 1:3 molar ratios, respectively. For each solution, mixing was performed for 3 hours at 70° C. to facilitate the reaction.

Polyamine batches were also synthesized with PEHA and diethylcarbonate (DEC). A PEHA solution was prepared by placing 50 g (0.22 mol) of PEHA into a 1 L vessel with 75 g of deionized water, which was then reacted with 26 g (0.22 mol), 52 g (0.44 mol), or 78 g (0.66 mol) of DEC in different reactions to achieve 1:1, 1:2, or 1:3 molar ratio batches, respectively. The other reaction conditions were the same as those of the PEHA and DMC reaction above.

Polyamine batches were also synthesized with N,N'-bis-(3-aminopropyl)ethylenediamine and DMC or DEC. An N,N'-bis-(3-aminopropyl)ethylenediamine solution was prepared by placing 50 g (0.29 mol) of N,N'-bis-(3-aminopropyl)ethylenediamine into a 1 L vessel with 75 g of deionized water, which was then reacted with 26 g (0.29 mol) of DMC or 64 g (0.54 mol) of DEC in different reactions to achieve 1:1 or 1:2 molar ratio batches, respectively. The other reaction conditions were the same as those of the PEHA and DMC or DEC reactions above.

Although this example relates to PEHA and N,N'-bis-(3-aminopropyl)ethylenediamine reactions with DMC and DEC, it is contemplated that the embodiments described herein are compatible with polyamines produced by other reactions, such as reactions between amine compounds and other types of carbonate esters.

Example 2: Sorbent Preparation (Powder)

Silica powder was used in the following examples as the porous support. An average size of the silica powder ranged from about 1 μm to about 20 μm. A BET average surface area of the silica powder ranged from 150 m$^2$/g to 200 m$^2$/g. A BJH average pore volume of the silica powder ranged from 0.8 cc/g to 1.2 cc/g. A BET average pore radius of the silica powder ranged from 120 angstroms to 200 angstroms.

Amine impregnation and granulation were performed by pouring polyamine solution onto a bed of silica powder. The resulting slurry gets dried, and the dried film cake was crushed to a size range of 0.5 mm to 2.4 mm Prior to the impregnation, both silica powder and amine compound solutions were pre-heated at 60° C. for 15-30 min to improve dispersion of the amine compound into the pore structure of the silica powder. After the impregnation, the mixture was dried at 60° C. for 2-3 hours under $N_2$ atmosphere.

Example 3: Sorbent Preparation (Granules)

Amine impregnation and granulation were performed by charging silica powder into a disk pelletizer and injecting polyamine solution while rotating the disk until a wet granule was formed. After the granulation, the granule was dried at 60° C. for 2-3 hours under $N_2$ atmosphere.

The resulting granules were formed having an average size from about 0.5 mm to about 2.4 mm A BET average surface area of the granules ranged from 10 m$^2$/g to 20 m$^2$/g. A BJH average pore volume of the granules ranged from 0.1 cc/g to 0.2 cc/g. An BET average pore radius ranged from 200 angstroms to 300 angstroms.

Example 4: Adsorption Evaluation

Sorbent granules were placed into a packed bed reactor for $CO_2$ adsorption capacity measurements. $CO_2$ adsorption was measured over 60 minutes at 25° C. for an air flow of 0.1 m/s (meters/second) with a $CO_2$ concentration of 1000 ppm and 0% water by volume (to simulate indoor air conditions). Desorption was measured over 30 minutes at 50° C. for an air flow of 0.2 m/s with a $CO_2$ concentration of 400 ppm and 1% water by volume (to simulate outdoor air conditions). The performance of a $CO_2$ sorbent was measured by $CO_2$ capture amount (g-$CO_2$/L-sorbent) and amine capture efficiency (adsorbed $CO_2$ in milligrams per amine impregnated in the sorbent in grams).

Various samples were tested. Sample 1 contained 60 wt % silica powder support and 40 wt % polyamine (Example 1, PEHA:DMC=1:1), and was produced according to Example 2. Sample 1 demonstrated a $CO_2$ adsorption capacity of 11.32 g/L, and the capacity was stable through 30 adsorption/desorption cycles.

Sample 2 contained 60 wt % silica powder support and 40 wt % polyamine (Example 1, PEHA:DMC=1:2), and was produced according to Example 2. Sample 2 demonstrated a $CO_2$ adsorption capacity of 11.32 g/L.

Sample 3 contained 67 wt % silica powder support and 33 wt % polyamine (Example 1, PEHA:DMC=1:1), and was produced according to Example 3. Sample 3 demonstrated a $CO_2$ adsorption capacity of 12.56 g/L in the case of 50° C. desorption and 22.27 g/L at 65° C. desorption. Sorbent aging was performed by placing the sorbent in an oven under air at 50° C. for 100 hours, after which $CO_2$ adsorption capacity was measured. After the aging, the sorbent demonstrated a $CO_2$ adsorption capacity of 13.83 g/L in the case of 50° C. desorption and 24.91 g/L at 65° C. desorption.

Sample 4 contained 62 wt % silica powder support and 38 wt % polyamine (Example 1, PEHA:DMC=1:1), and was produced according to Example 3. Sample 4 demonstrated a $CO_2$ adsorption capacity of 13.73 g/L in the case of 50° C. desorption and 30.80 g/L at 65° C. desorption. Sorbent aging was performed by placing the sorbent in an oven under air at 50° C. for 100 hours, after which $CO_2$ adsorption capacity was measured. After the aging, the sorbent demonstrated a $CO_2$ adsorption capacity of 13.43 g/L in the case of 50° C. desorption and 27.03 g/L at 65° C. desorption.

Sample 5 contained 55 wt % silica powder support and 45 wt % polyamine (Example 1, PEHA:DMC=1:1), and was produced according to Example 3. Sample 5 demonstrated a $CO_2$ adsorption capacity of 16.34 g/L in the case of 50° C. desorption and 32.29 g/L at 65° C. desorption.

Sample 6 contained 50 wt % silica powder support and 50 wt % polyamine (Example 1, PEHA:DMC=1:1), and was produced according to Example 3. Sample 6 demonstrated a $CO_2$ adsorption capacity of 13.43 g/L in the case of 50° C. desorption and 31.09 g/L at 65° C. desorption.

Sample 7 was prepared using a similar method as Sample 1 in which the sorbent contained 60 wt % silica powder and 40 wt % polyamine, except that the polyamine was produced based on a reaction between PEHA and formaldehyde. The $CO_2$ adsorption capacity of Sample 7 was 7.06 g/L, which was comparatively less than that of Sample 1. Samples 8 and 9 were prepared similarly to Sample 7, and yielded $CO_2$ adsorption capacities of 7.17 g/L and 7.63 g/L, respectively.

Sample 10 was prepared by impregnating diethanolamine onto an attapulgite-based granule support. The sorbent of Sample 10 include 72 wt % attapulgite-based granule support and 28 wt % diethanolamine. A $CO_2$ adsorption capacity was 16.43 g/L at the 65° C. desorption.

Sample 11 was prepared by impregnating diethanolamine onto an attapulgite-based granule support having a silicon-based coating formed thereon. The silicon-based coating was formed on the support by treatment with 20 wt % tetraethylorthosilicate (TEOS). The sorbent of Sample 11 included 72 wt % attapulgite-based granule support having a silicon-based coating and 28 wt % diethanolamine. A $CO_2$ adsorption capacity was 10.49 g/L at the 50° C. desorption initially, and was stable around 9.69 g/L-9.89 g/L through 28 adsorption/desorption cycles.

Sample 12 was prepared by impregnating diethanolamine onto an attapulgite-based granule support having a silicon-based coating formed thereon. The silicon-based coating was formed on the support by treatment with 2.6 wt % sodium silicate solution (a solid content 48.9% with $Na_2O$:$SiO_2$=1.3). The sorbent of Sample 12 included 71 wt % attapulgite-based granule support having a silicon-based coating and 29 wt % diethanolamine. A $CO_2$ adsorption capacity was 9.13 g/L at the 50° C. desorption. Sorbent aging was performed by placing the sorbent in an oven under air at 50° C. for 100 hours, after which $CO_2$ adsorption capacity was measured. After the aging, the sorbent demonstrated a $CO_2$ adsorption capacity of 8.10 g/L at the 50° C. desorption.

Sample 13 contained 55 wt % silica powder support and 45 wt % polyamine (Example 1, PEHA:DEC=1:1), and was produced according to Example 3. Sample 13 demonstrated a $CO_2$ adsorption capacity of 13.67 g/L in the case of 50° C. desorption and 40.10 g/L at 65° C. desorption.

Sample 14 contained 55 wt % silica powder support and 45 wt % polyamine (Example 1, PEHA:DEC=1:2), and was produced according to Example 3. Sample 14 demonstrated a $CO_2$ adsorption capacity of 16.36 g/L in the case of 50° C. desorption and 23.26 g/L at 65° C. desorption.

Example 5: Aging Analysis $CO_2$ adsorption capacity and stability against thermal aging were each analyzed by thermogravimetric analysis. Stability against thermal aging of sorbents was evaluated by measuring a deactivation factor for each sorbent. Deactivation factor is a ratio of adsorption capacity of aged sorbent versus adsorption capacity of fresh sorbent, with a higher deactivation factor denoting a higher stability of the sorbent's adsorption capacity.

Sorbents were subjected to an accelerated thermal/oxidation exposure process in which the sorbents were cycled 5 times between 1000 ppm $CO_2$ at 30° C. in air for 30 minutes and $N_2$ at 50° C. for 30 minutes, followed by an aging process in which the sorbents were exposed to $N_2$ for 6 hours at 100° C. followed by air for 2 hours at 90° C. The sorbents were cycled 5 times again after the aging process in order to compare the adsorption capacities before and after aging.

Sample 1 demonstrated a $CO_2$ adsorption capacity of 2.32 wt % (g-CO2/g-sorbent) and a deactivation factor of 94%. Note that this result was obtained with a powder sample which contained 60 wt % silica powder support and 40 wt % polyamine, and the granulation process was not performed afterwards. Sample 3 demonstrated a $CO_2$ adsorption capacity of 1.68 wt % (g-$CO_2$/g-sorbent) and a deactivation factor of 95%. Sample 5 demonstrated a $CO_2$ adsorption capacity of 1.60 wt % (g-$CO_2$/g-sorbent) and a deactivation factor of 100%. The $CO_2$ adsorption capacity tests for Samples 3 and 5 were performed with the granulate samples.

Sample 7 demonstrated a $CO_2$ adsorption capacity of 1.99 wt % (g-$CO_2$/g-sorbent) and a deactivation factor of 89%.

Sample 11, which included 72 wt % attapulgite-based support having a TEOS layer coated thereon and 28 wt % diethanolamine, demonstrated a $CO_2$ adsorption capacity of 1.08 wt % (g-$CO_2$/g-sorbent) and a deactivation factor of 34%.

Sample 12, which included 71 wt % attapulgite-based support having a sodium silicate layer coated thereon and 29 wt % diethanolamine, demonstrated a $CO_2$ adsorption capacity of 0.89 wt % (g-$CO_2$/g-sorbent) and a deactivation factor of 43%.

Sample 15 was a powder sample which contained 60 wt % silica powder support and 40 wt % polyamine (Example 1, PEHA:DMC=1:0.5), with no granulation process being performed afterwards. Sample 15 demonstrated a $CO_2$ adsorption capacity of 1.66 wt % (g-$CO_2$/g-sorbent) and a deactivation factor of 106%.

Sample 16 was a powder sample which contained 60 wt % silica powder support and 40 wt % polyamine (Example 1, PEHA:DMC=1:3), with no granulation process being performed afterwards. Sample 16 demonstrated a $CO_2$ adsorption capacity of 1.69 wt % (g-$CO_2$/g-sorbent) and a deactivation factor of 96%.

Sample 17 was a powder sample which contained 60 wt % silica powder support and 40 wt % polyamine (Example 1, PEHA:DEC=1:1), with no granulation process being performed afterwards. Sample 17 demonstrated a $CO_2$ adsorption capacity of 2.44 wt % (g-$CO_2$/g-sorbent) and a deactivation factor of 96%.

Sample 18 was a powder sample which contained 60 wt % silica powder support and 40 wt % polyamine (Example 1, PEHA:DEC=1:2), with no granulation process being performed afterwards. Sample 18 demonstrated a $CO_2$ adsorption capacity of 3.05 wt % (g-CO2/g-sorbent) and a deactivation factor of 101%.

Sample 19 was a powder sample which contained 60 wt % silica powder support and 40 wt % polyamine (Example 1, PEHA:DEC=1:3), with no granulation process being performed afterwards. Sample 19 demonstrated a $CO_2$ adsorption capacity of 1.62 wt % (g-$CO_2$/g-sorbent) and a deactivation factor of 95%.

Sample 20 was a powder sample which contained 60 wt % silica powder support and 40 wt % polyamine (Example 1, PEHA:DEC=1:1), with no granulation process being performed afterwards. Sample 20 demonstrated a $CO_2$ adsorption capacity of 3.81 wt % (g-$CO_2$/g-sorbent) and a deactivation factor of 92%.

Sample 21 was a powder sample which contained 60 wt % silica powder support and 40 wt % polyamine (Example 1, PEHA:DEC=1:2), with no granulation process being performed afterwards. Sample 21 demonstrated a $CO_2$ adsorption capacity of 3.18 wt % (g-$CO_2$/g-sorbent) and a deactivation factor of 97%.

In summary, it was found that, in certain embodiments, granules comprising polyamine and silica powder demonstrated higher stability against aging at 50° C. and multiple adsorption/desorption cycles than DEA impregnated onto an attapulgite-based granule support coated with a silicon-based coating and DEA impregnated onto an attapulgite-based granule support directly without a silicon-based coating. Also, granules and powders comprising polyamine produced by reacting PEHA and DEC demonstrated high $CO_2$ adsorption capacity and deactivation factor, and the ratio of PEHA to DEC had an impact on the $CO_2$ adsorption capacity and deactivation factor of the resulting sorbents.

Example 6: Formaldehyde Adsorption Studies

About 20 mL (11 g) of a sorbent produced according to Example 3 (with an average particle diameter from 1.7 mm to 2.3 mm), referred to as Sample 22 (which contained 55 wt % silica powder support and 45 wt % polyamine produced according to Example 1 with PEHA:DMC=1:1), was loaded into a plug flow reactor and an air stream containing 2 ppm formaldehyde was passed over the sample at a space velocity of 50,000 $h^{-1}$ at 30° C. The air stream also contained ~400 ppm of $CO_2$ and 1% $H_2O$, which did not inhibit the absorption of formaldehyde.

Figure 6:
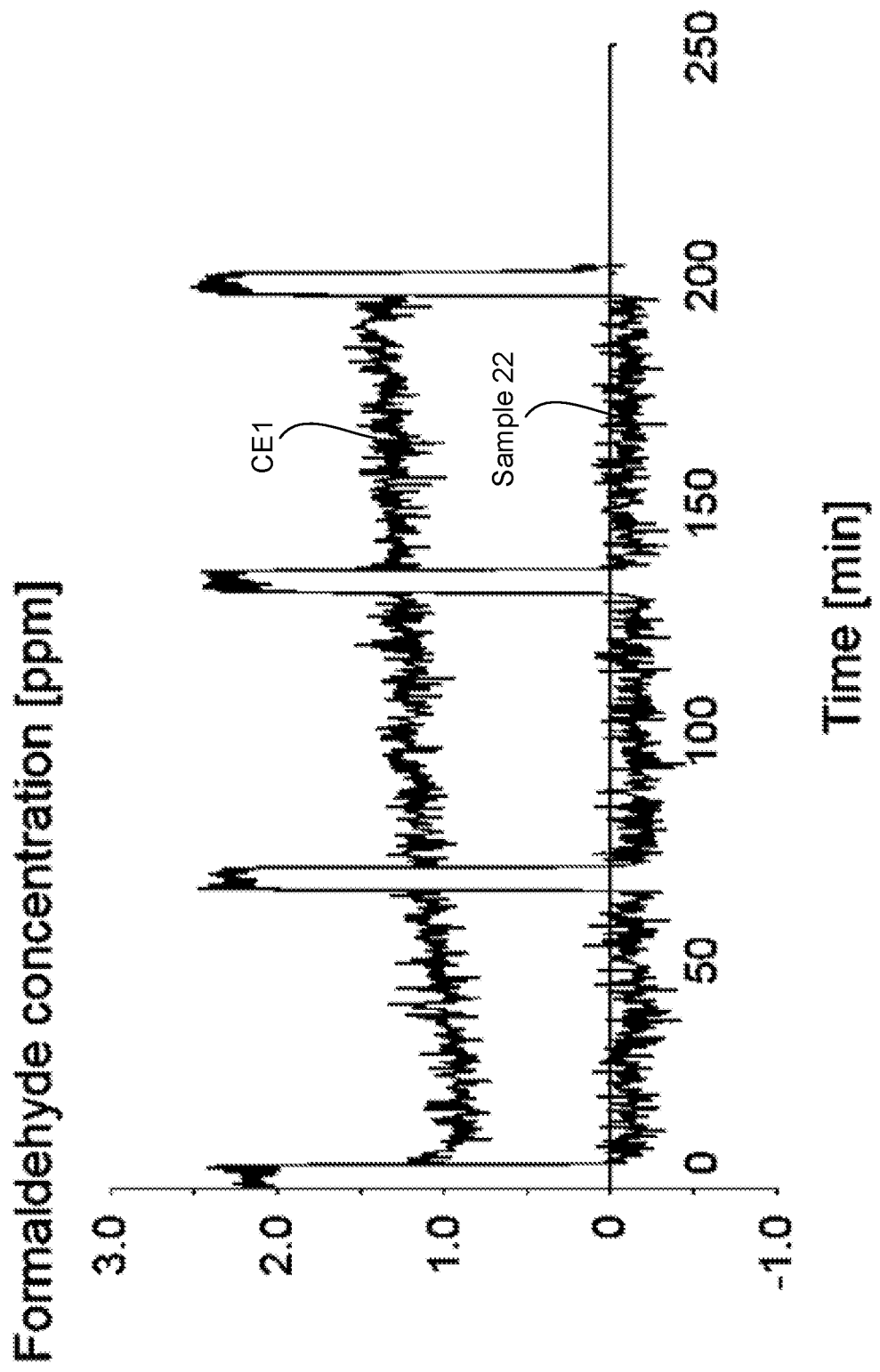
FIG. 6 is a plot comparing formaldehyde adsorption of a comparative example to a sorbent produced in accordance with an embodiment of the disclosure.

FIG. 6 is a plot comparing the adsorption of formaldehyde of Sample 22 with a comparative example 1 (CE1) for three adsorption cycles over a period of about 200 minutes. The peaks correspond to intervals when the air flow was not passing through the sorbent, while the valleys correspond to intervals when the air flow passed through the sorbent. As shown, the CE absorbed nearly half of the formaldehyde, with decreasing adsorption each cycle, while Sample 22 demonstrated nearly 100% adsorption of formaldehyde with no observable decrease in adsorption.

Formaldehyde adsorption capacities were measured using thermogravimetric analysis (TGA) for Sample 22 and various other comparative examples. Samples were pre-treated at 60° C. for 12 hours under vacuum and nitrogen overnight. The sequence of TGA run was as follows: pretreatment was performed at 80° C. for 2 hours under helium and kept room temperature under 100 ppm formaldehyde (50 ml/min) for 3 hours (the process was also performed using 10 hours of formaldehyde exposure). The weight gain during the latter 3 hours (or 10 hours) was then measured. The results are indicated below in Table 1, with adsorption capacity in units of wt % (weight adsorbed per weight of sorbent after the 2 hour pretreatment period).

TABLE 1

| Sample Parameters | | | |
| --- | --- | --- | --- |
| Sample | CE1 | Sample 22 | CE3 |
| Amine Chemistry | enaminones and corresponding 3-diketone/amine pairs, imines, and hydrazines, or salts derived from these compounds | (see Example 1, 3) | crosslinked polystyrene with primary amine |
| Particle size (μm) | 0.2-8 mm | 0.5-1.0 mm (for TGA)/ 1.7-2.3 mm (for FIG. 6 and FIG. 7) | 0.315-1.25 mm |
| BET Average Surface Area ($m^2$/g) | 312.9 | 21.8 (for TGA)/20.2 (for FIG. 6 and FIG. 7) | 5.1 |
| BJH Average Pore Volume (cc/g) | 0.23 | 0.223 (for TGA)/ 0.230 (for FIG. 6 and FIG. 7) | 0.020 |
| BET Average Pore Radius (Å) | 12.38 | 257 (for TGA)/259 (for FIG. 6 and FIG. 7) | 169 |
| Formaldehyde Adsorption Capacity (wt %) | 0.060 | 0.846 (1.694 for 10 hours of formaldehyde exposure) | 0.572 |

Example 7: Acetaldehyde Adsorption Studies

Similar to Example 6, about 20 mL (11 g) of the Sample 22 adsorbent was loaded into a plug flow reactor and an air stream containing 10 ppm acetaldehyde was passed over the sample at a space velocity of 100,000 $h^{-1}$ at 30° C. The air stream also contained ~400 ppm of $CO_2$ and 1% $H_2O$, which did not inhibit the absorption of acetaldehyde.

Figure 7:
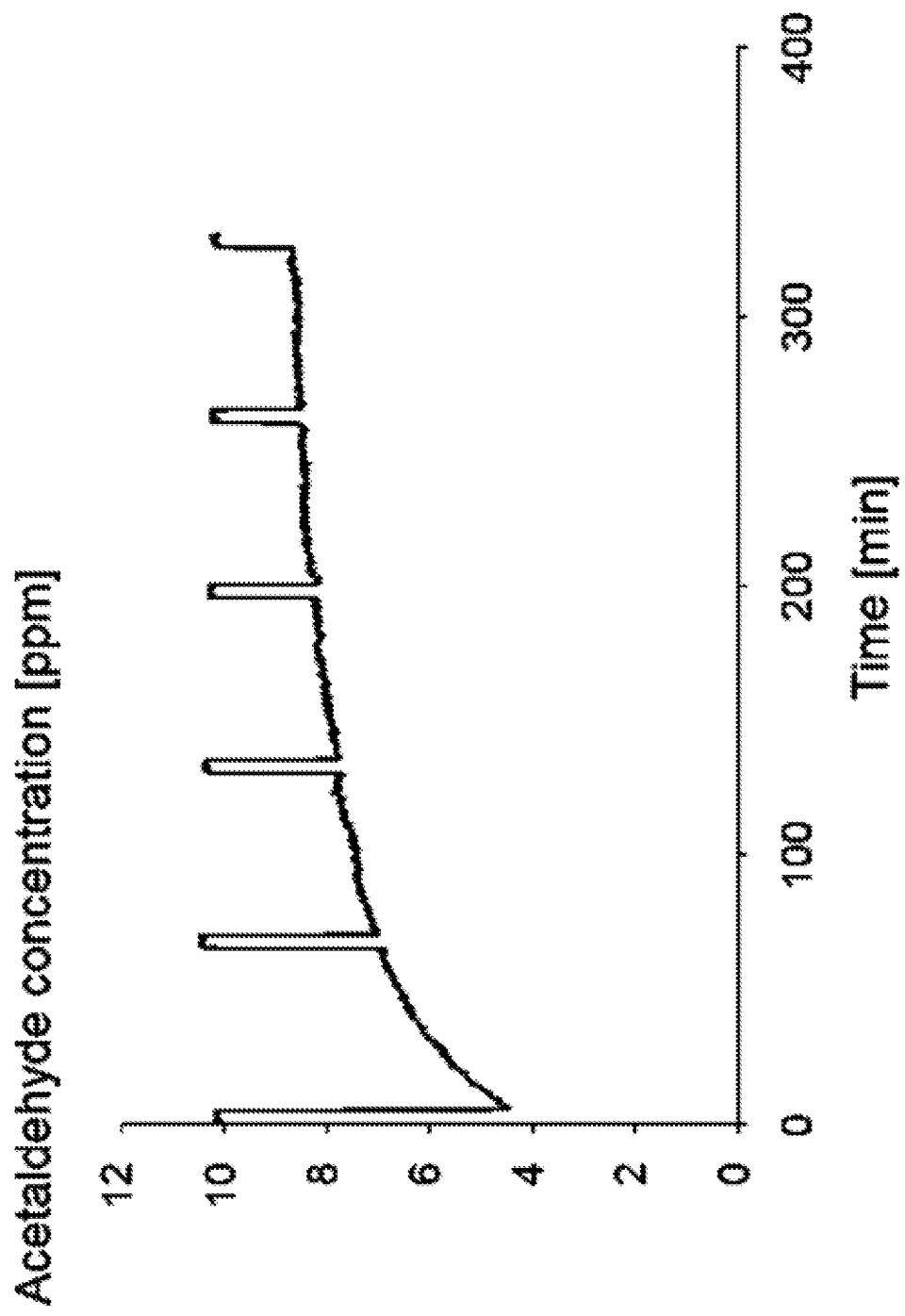
FIG. 7 is a plot showing acetaldehyde adsorption of a sorbent produced in accordance with an embodiment of the disclosure.

FIG. 7 is a plot of the adsorption of acetaldehyde of Sample 22 for five adsorption cycles over a period of about 330 minutes. The peaks correspond to intervals when the air flow was not passing through the sorbent, while the valleys correspond to intervals when the air flow passed through the sorbent. As shown, Sample 22 demonstrated the ability to adsorb acetaldehyde in addition to formaldehyde.

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment, and such references mean "at least one".

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A sorbent comprising:
a porous support; and
a gas-adsorbing material coated onto the porous support, the gas-adsorbing material comprising one or more polyamines, wherein the one or more polyamines are produced from a reaction of an amine compound with a reactant, wherein the reactant comprises a carbonate ester compound or a ketone compound, and wherein the reaction is free of formaldehyde as a reaction product and/or a reactant.

2. The sorbent of claim 1, wherein the amine compound comprises one or more of pentaethylenehexamine, diethanolamine, tetraethylenepentamine, triethylenetetramine, tetraethylenetetramine, bis(2-hydroxypropyl)amine, N,N'-bis (2-hydroxyethyl)ethylenediamine, monoethanolamine, diisopropanolamine, alkylamines, methylamine, linear polyethyleneimine, branched polyethyleneimine, dimethylamine, diethylamine, methyldiethanolamine, methylethanolamine, polyethylene polyamine, diethylenetriamine, N,N'-bis-(3-aminopropyl)ethylenediamine, or polyethylene.

3. The sorbent of claim 1, wherein the amine compound comprises pentaethylenehexamine or N,N'-bis-(3-aminopropyl)ethylenediamine.

4. The sorbent of claim 1, wherein the carbonate ester compound has a formula:

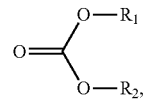

wherein $R_1$ and $R_2$ are independently selected from a group consisting of hydrogen, halogen, alkanoyl, alkyl, optionally substituted alkyl, cycloalkyl, optionally substituted cycloalkyl, alkenyl, optionally substituted alkenyl, cycloalkenyl, optionally substituted cycloalkenyl, alkynyl, optionally substituted alkynyl, hydroxy, aryl, optionally substituted aryl, aralkyl, (heterocyclo)alkyl, (heteroaryl)alkyl, (amino)alkyl, (alkylamino)alkyl, (dialkylamino)alkyl, (carboxamido)alkyl, (cyano)alkyl, alkoxyalkyl, and hydroxyalkyl.

5. The sorbent of claim 1 wherein the reactant comprises one or more of dimethyl carbonate or diethyl carbonate.

6. The sorbent of claim 1, wherein the porous support comprises one or more of bentonite, attapulgite, kaolinite, montmorillonite, ball clay, fuller's earth, hectorite, palygorskite, saponite, sepiolite, halloysite, silica, calcium sulfate, zeolite, synthetic zeolite, alumina, titania, fumed silica, activated charcoal, or metal organic framework, and wherein the polyamine is present in an amount from 20% to 60% of a total weight of the sorbent.

7. The sorbent of claim 1, wherein a surface area of the porous support is greater than 50 $m^2/g$, wherein an average pore volume of the porous support is greater than 0.1 cc/g and less than 3.0 cc/g, and wherein the porous support is in a form of granules having a diameter ranging from about 0.25 mm to about 5 mm.

8. The sorbent of claim 1, wherein the porous support comprises a silicon-based coating formed thereon.

9. The sorbent of claim 1, wherein the sorbent is incorporated into an air filter unit of a system selected from a group consisting of: a $CO_2$ and/or volatile organic compound scrubbing system, an automobile ventilation system, an aircraft environmental control system, atmospheric air purification system, and a food storage system.

10. The sorbent of claim 1, wherein the sorbent is incorporated into a paint composition or a polytetrafluoroethylene air filter sheet.

11. A sorbent comprising:
a porous support; and
a gas-adsorbing material coated onto the porous support, the gas-adsorbing material comprising one or more polyamines produced according to a reaction of pentaethylenehexamine and dimethyl carbonate, wherein the reaction is free of formaldehyde as a reaction product and/or a reactant.

* * * * *